(12) United States Patent
McNeil

(10) Patent No.: US 11,779,981 B2
(45) Date of Patent: Oct. 10, 2023

(54) METHODS FOR MAKING LAYERED TUBULAR STRUCTURES

(71) Applicant: Techreo LLC, Loveland, OH (US)

(72) Inventor: Kevin B. McNeil, Loveland, OH (US)

(73) Assignee: Kevin McNeil, Loveland, OH (US)

( * ) Notice: Subject to any disclaimer, the term of this patent is extended or adjusted under 35 U.S.C. 154(b) by 805 days.

(21) Appl. No.: 16/747,423

(22) Filed: Jan. 20, 2020

(65) Prior Publication Data

US 2020/0282440 A1   Sep. 10, 2020

Related U.S. Application Data

(60) Provisional application No. 62/794,638, filed on Jan. 20, 2019.

(51) Int. Cl.
| | | |
|---|---|---|
| *B32B 37/00* | (2006.01) | |
| *B21C 37/12* | (2006.01) | |
| *F16L 9/16* | (2006.01) | |
| *B32B 37/12* | (2006.01) | |
| *B65H 69/02* | (2006.01) | |
| *B65H 69/08* | (2006.01) | |
| *B29C 65/00* | (2006.01) | |

(52) U.S. Cl.
CPC .......... *B21C 37/123* (2013.01); *B21C 37/126* (2013.01); *B21C 37/127* (2013.01); *B21C 37/128* (2013.01); *B32B 37/0076* (2013.01); *B32B 37/12* (2013.01); *B65H 69/02* (2013.01); *B65H 69/08* (2013.01); *F16L 9/165* (2013.01); *B21C 37/12* (2013.01); *B21C 37/122* (2013.01); *B29C 66/4326* (2013.01)

(58) Field of Classification Search
CPC ... B29C 66/4322; B21C 37/12; B21C 37/122; B21C 37/123; B21C 37/126; B21C 37/127
See application file for complete search history.

(56) References Cited

U.S. PATENT DOCUMENTS

| | | |
|---|---|---|
| 2,002,470 A | 5/1935 | Cornell |
| 2,104,884 A | 1/1938 | Quarnstrom |
| 2,412,186 A | 12/1946 | Whitehouse et al. |
| 2,640,501 A | 6/1953 | Scott et al. |
| 2,663,324 A | 12/1953 | Fentress |
| 3,034,808 A | 5/1962 | Poundstone |
| 3,074,584 A | 1/1963 | Dobell |
| 3,092,148 A | 6/1963 | Carstens |
| 3,163,183 A | 12/1964 | Sagara |
| 3,191,289 A | 6/1965 | Fleischer |
| 3,296,945 A | 1/1967 | Cvacho et al. |
| 3,366,719 A | 1/1968 | Lueders |
| 3,483,896 A | 12/1969 | Grosh |

(Continued)

FOREIGN PATENT DOCUMENTS

| | | |
|---|---|---|
| DE | 16513381 | 10/1996 |
| GB | 747194 | 3/1956 |

*Primary Examiner* — Philip C Tucker
*Assistant Examiner* — Nickolas R Harm
(74) *Attorney, Agent, or Firm* — Stephen T. Murphy; Peter D. Meyer

(57) ABSTRACT

A process for winding a convolutely wound tubular structure having a machine direction, a cross-machine direction coplanar thereto, and a Z-direction orthogonal to both the machine- and cross-machine directions is disclosed.

20 Claims, 19 Drawing Sheets

(56) References Cited

U.S. PATENT DOCUMENTS

| | | | |
|---|---|---|---|
| 3,528,162 A * | 9/1970 | Hideo | B01J 3/048 228/129 |
| 3,648,883 A | 3/1972 | Bridenstine | |
| 3,746,050 A | 7/1973 | Born | |
| 4,082,211 A * | 4/1978 | Embury | B23K 5/086 228/145 |
| 4,247,033 A * | 1/1981 | Dahmen | B21C 37/123 228/9 |
| 4,640,453 A * | 2/1987 | Oe | B21C 37/123 228/145 |
| 4,652,019 A | 3/1987 | von Ahrens | |
| 4,657,049 A * | 4/1987 | Fourty | F16L 9/16 138/144 |
| 4,682,632 A | 7/1987 | Wiedenhoff | |
| 4,687,690 A | 8/1987 | Menzel | |
| 5,484,974 A | 1/1996 | Vellmer et al. | |
| 5,958,602 A | 9/1999 | Usui | |
| 6,405,761 B1 | 6/2002 | Shimizu | |
| 7,065,999 B2 | 6/2006 | Fukuchi | |
| 2001/0018839 A1 * | 9/2001 | Miller | B21C 37/124 72/49 |
| 2003/0232162 A1 | 12/2003 | Renck et al. | |
| 2004/0096604 A1 | 5/2004 | Van de Camp | |
| 2004/0111863 A1 | 6/2004 | Binggeli | |
| 2007/0298672 A1 | 12/2007 | Iida | |
| 2009/0288467 A1 | 11/2009 | Berg | |
| 2009/0320542 A1 * | 12/2009 | Kephart | B21C 37/121 72/49 |
| 2009/0320953 A1 | 12/2009 | Fletcher et al. | |
| 2010/0104782 A1 | 4/2010 | Niu et al. | |
| 2010/0139848 A1 | 6/2010 | Burke et al. | |
| 2012/0000565 A1 | 1/2012 | Bolam et al. | |
| 2012/0073348 A1 | 3/2012 | Prehn | |
| 2012/0273556 A1 * | 11/2012 | Unan | B21C 47/02 228/154 |
| 2013/0074564 A1 * | 3/2013 | Smith | B21C 37/126 72/133 |
| 2014/0311614 A1 | 10/2014 | Edmondson et al. | |
| 2015/0273550 A1 * | 10/2015 | Takata | B21C 37/124 72/12.5 |

\* cited by examiner

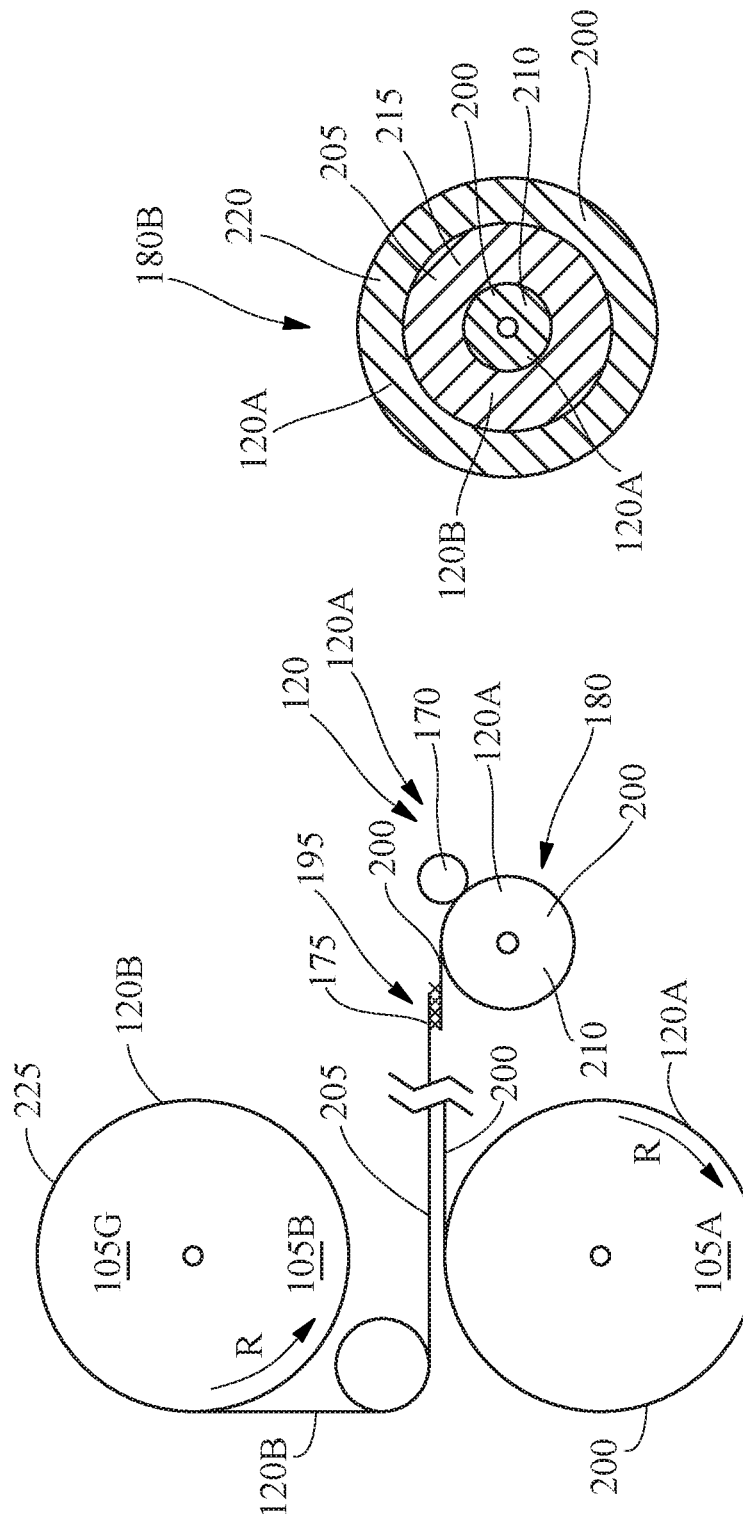

METHODS FOR MAKING LAYERED TUBULAR STRUCTURES

FIELD OF THE INVENTION

The present disclosure provides improved methods for making tubular structures and tubular structures having novel features. The present disclosure more particularly provides for methods to manufacture tubular structures that can be light weight and/or comprise novel features suitable for use as pipes, structural tubes, barrels, and tanks. The present disclosure provides for the manufacture of such tubular structures by convolutely winding sheet metal about a mandrel that defines the longitudinal axis, interior cross-sectional shape, and interior size of the tubular structure. The present disclosure also provides a layered manufacturing process to produce exceptionally high quality tubular structures where the starting inside dimension, wall thickness, and exterior dimension are precisely defined and controlled. Further, the present disclosure provides for a layered manufacturing process that can produce unique tubular structures that feature options such as combining different materials, high strength-to-weight properties, enclosed insulation zones, improved vibration and noise dampening, secondary fluid passageways, and integrated couplings or other useful components such as sensors.

BACKGROUND OF THE INVENTION

Pipes are long, hollow tubular structures used for a variety of purposes. They are now generally produced by two distinct methods that result in either a welded or seamless pipe. In both methods, raw steel is first cast into a more workable starting form. It is then made into a pipe by stretching the steel out into a seamless tube or forcing the edges together and sealing them with a weld.

As mentioned, tubular structures such as pipe come in generally two configurations—seamless and welded. Both generally have different uses. Seamless tubes are typically lighter-weight and have thinner walls and are generally used for transporting liquids. Welded tubes are heavier, more rigid, have a better consistency, are typically straighter, and generally used for gas transportation, electrical conduit, and plumbing. Typically, they are used in instances when the pipe is not put under a high degree of stress.

The primary raw material in pipe production is steel. Steel is made up of primarily iron. Other metals that may be present in the alloy include aluminum, manganese, titanium, tungsten, vanadium, and zirconium. Some finishing materials are sometimes used during production.

Steel pipes can generally be made by two different processes. The overall production method for both processes involves three steps. First, raw steel is converted into a more workable form (e.g., ingots, blooms, slabs). Next, the pipe is formed on a continuous or semi-continuous production line. Finally, the pipe is cut and modified to meet the customer's needs.

Molten steel is made by melting iron ore and coke (a carbon-rich substance that results when coal is heated in the absence of air) in a furnace. Most of the carbon is removed by blasting oxygen into the liquid. The molten steel is then poured into large, thick-walled iron molds, where it cools into ingots.

To produce a bloom, the ingot is passed through a pair of grooved steel rollers that are stacked. These types of rollers are called "two-high mills." In some cases, three rollers are used. The rollers are mounted so that their grooves coincide, and they move in opposite directions. This action causes the steel to be squeezed and stretched into thinner, longer pieces. When the rollers are reversed by the human operator, the steel is pulled back through making it thinner and longer. This process is repeated until the steel achieves the desired shape. During this process, machines called manipulators flip the steel so that each side is processed evenly.

Blooms are typically processed further before they are made into pipes. Blooms are converted into billets by putting them through more rolling devices which make them longer and narrower. The billets are cut by devices known as flying shears. These are a pair of synchronized shears that race along with the moving billet and cut it. This allows efficient cuts without stopping the manufacturing process. These billets are stacked and will eventually become seamless pipe.

Slabs are also reworked. To make them malleable, they are first heated to 2,200° F. (1,204° C.). This causes an oxide coating to form on the surface of the slab. This coating is broken off with a scale breaker and high pressure water spray. The slabs are then sent through a series of rollers on a hot mill and made into thin, narrow strips of steel called skelp. This mill can be as long as a half mile. As the slabs pass through the rollers, they become thinner and longer. In the course of about three minutes a single slab can be converted from a 6 in (15.2 cm) thick piece of steel to a thin steel ribbon that can be a quarter mile long.

After stretching, the steel is pickled. This process involves running it through a series of tanks that contain sulfuric acid to clean the metal. To finish, it is rinsed with cold and hot water, dried, and then rolled up on large spools and packaged for transport to a pipe making facility.

Both skelp and billets are used to make pipes. Skelp is made into welded pipe. It is first placed on an unwinding machine. As the spool of steel is unwound, it is heated. The steel is then passed through a series of grooved rollers. As it passes by, the rollers cause the edges of the skelp to curl together. This forms an unwelded pipe.

The steel next passes by welding electrodes. These devices seal the two ends of the pipe together. The welded seam is then passed through a high pressure roller which helps create a tight weld. The pipe is then cut to a desired length and stacked for further processing. Welded steel pipe is a continuous process and depending on the size of the pipe, it can be made as fast as 1,100 ft (335.3 m) per minute.

When seamless pipe is needed, square billets are used for production. They are heated and molded to form a cylinder shape, also called a round. The round is then put in a furnace where it is heated white-hot. The heated round is then rolled with great pressure. This high pressure rolling causes the billet to stretch out and a hole to form in the center. Since this hole is irregularly shaped, a bullet shaped piercer point is pushed through the second of the billet as it is being rolled. After the piercing stage, the pipe may still be of irregular thickness and shape. To correct this, it is passed through another series of rolling mills.

After either type of pipe is made, they may be put through a straightening machine. They may also be fitted with joints so two or more pieces of pipe can be connected. The most common type of joint for pipes with smaller diameters is threading—tight grooves that are cut into the end of the pipe. The pipes are also sent through a measuring machine. This information along with other quality control data is automatically stenciled on the pipe. The pipe is then sprayed with a light coating of protective oil. Most pipe is typically treated to prevent it from rusting. This is done by galvanizing it or giving it a coating of zinc. Depending on the use of the pipe, other paints or coatings may be used.

The characteristics of tubular structures such as pipe can be controlled during production. For example, the diameter of the pipe is often modified depending on how it will be used. The diameter can range from small pipes to large pipes used to transport gas throughout a city. The wall thickness of the pipe can also be controlled with very limited accuracy. Often, the type of steel will also have an impact on the pipe's strength and flexibility. Other controllable characteristics include length, coating material, and end finish. In any regard, it is understood by one of skill in the art that the tubular structures such as pipe made according to the generally understood processes will typically comprise a single homogenous metal, are exceptionally heavy, have limited dimensional accuracy, propagate a high degree of vibration and noise, and are difficult to modify or integrate components therein.

Thus, one of skill in the art understands that there is a clear need to provide a method to manufacture tubular structures, such as pipes, that are lightweight and easy to modify. Further, there is a clear need to provide a layered manufacturing process for tubular structures that can produce exceptionally high quality tubular structures where the starting inside dimension, wall thickness, and exterior dimension can be precisely defined and controlled. Further, there is a need for a layered manufacturing process that can produce unique tubular structures that feature options such as combining different materials, high strength-to-weight properties, enclosed insulation zones, improved vibration and noise dampening, secondary fluid passageways, and integrated couplings or other useful components such as sensors.

SUMMARY OF THE INVENTION

The present disclosure provides for a process for winding a convolutely wound tubular structure having a machine direction, a cross-machine direction coplanar thereto, and a Z-direction orthogonal to both the machine- and cross-machine directions. The process comprises the steps of: a) providing a first sheet metal supply coil comprising a first sheet metal; b) disposing said first sheet metal supply coil on an uncoiler; c) unwinding said first sheet metal from said first sheet metal supply coil with said uncoiler; d) directing said first sheet metal to a recoiler; e) providing said recoiler with a mandrel, said mandrel having a defined geometry, said geometry providing said convolutely wound tubular structure with a desired internal cross-sectional shape and size; f) disposing a leading edge of said first sheet metal on said mandrel; g) rotating said mandrel to coaxially dispose said first sheet metal about said mandrel to form a first inner region of said convolutely wound tubular structure and provide said first inner region of said convolutely wound tubular structure with a first desired thickness; h) when said first inner region of said convolutely wound tubular structure attains said first desired thickness, severing said first sheet metal in said cross-machine direction, forming a first tail portion of said first inner region; i) attaching said first tail portion of said first inner region to a previous convolution of said first inner region of said convolutely wound tubular structure; and, j) removing said convolutely wound tubular structure from said mandrel.

DRAWINGS

FIG. 3 is a side elevational view of another process for the manufacture of tubular structures;

FIG. 4 is a cross-sectional view of an exemplary convolutely wound tubular structure;

DETAILED DESCRIPTION

As used herein, a "tubular structure" refers to a product that is generally symmetrically formed about a longitudinal axis and often has a high aspect ratio (length is much longer than the maximum cross-sectional dimension). A tubular structure may have a cross section that is circular, rectangular, square, or any other desired shape.

The terms machine direction, cross-machine direction, and Z-direction are generally relative to the direction of sheet metal 120 travel through a manufacturing process. The "machine direction" is known to those of skill in the art as the direction of travel of sheet metal 120 through the process. The "cross-machine direction" is orthogonal and coplanar thereto. The "Z-direction" is orthogonal to both the machine- and cross-machine directions.

Sheet Metal Supply Coils and Sheet Metal

Although any re-coilable material can be used (i.e., metal or non-metal), the preferred raw material for the convolutely wound tubular structures 180 (also referred to herein as tubular structures 180) of the present disclosure is generally provided as a coil of relatively thin sheet metal. A sheet metal is typically provided in a relatively thin form where the Z-direction dimension is substantially less than the machine- and cross-machine direction dimensions. A sheet metal is convolutely wound about a core. The thickness of the sheet metal may be selected from a wide range of available gauges. In one non-limiting example, the sheet metal has a thickness of 0.002 inches to 0.100 inches (0.051 mm-2.540 mm). The width of the supply coils may also be selected from a wide range of available slit widths. In one non-limiting example, supply coils are used which have a width of 30 inches to 96 inches (0.762 meters-2.438 meters). The sheet metal may be selected to provide the desired properties of the tubular structure. Many metals are suitable and include, but are not limited to, carbon steel, stainless steel, metal alloys, titanium, cobalt, aluminum, brass, and copper. The sheet metal may be prepared using various manufacturing methods known in the art to provide sheet metal with the desired physical properties prior to being wound into supply coils. For example, carbon steel may be provided as cold rolled sheet metal coils, hot rolled sheet metal coils, or galvanized sheet metal coils.

Unwinding

Figure 1:
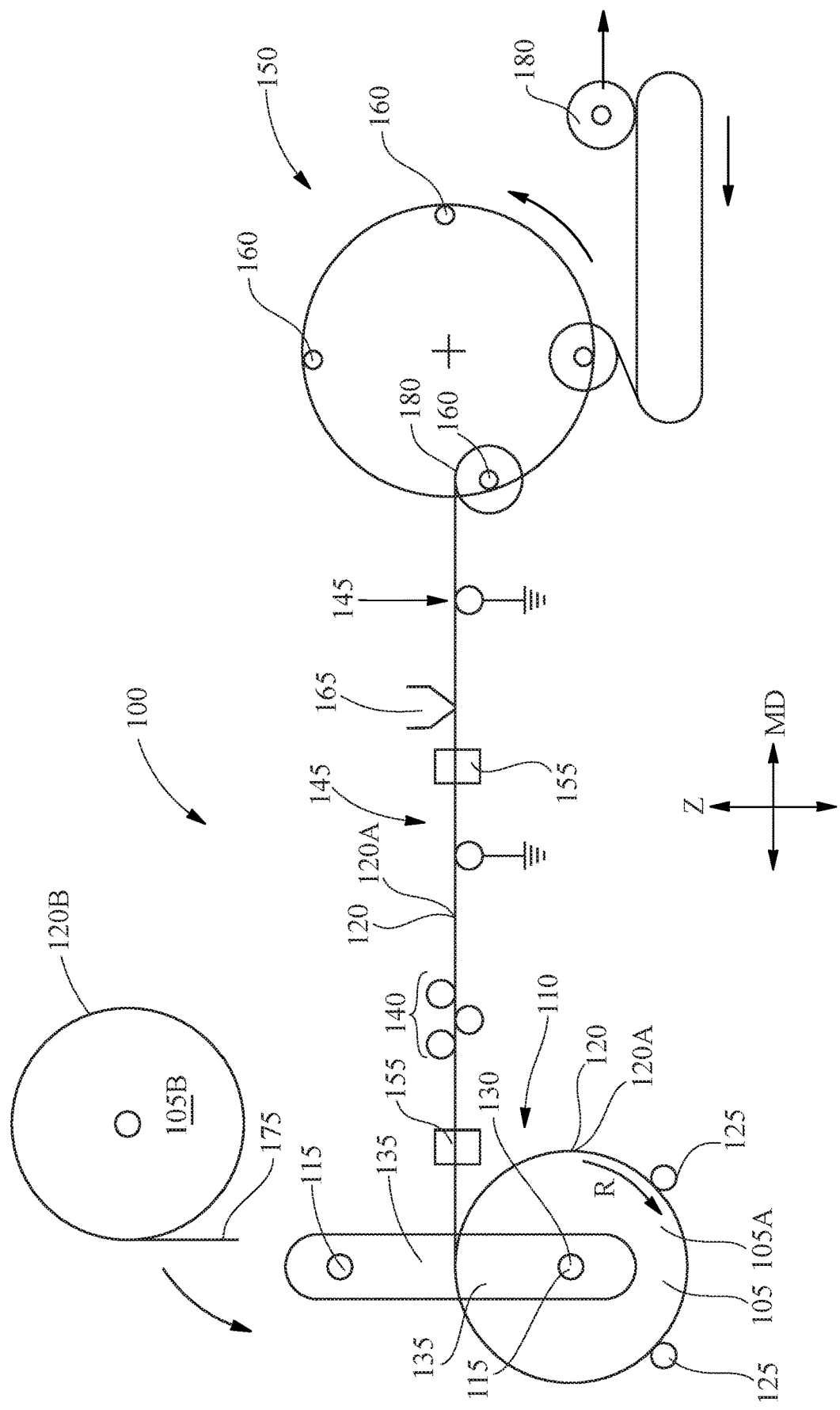
FIG. 1 is a side elevational view of an exemplary process for the manufacture of tubular structures consistent with the present disclosure.

As shown in FIG. 1, a process 100 for making tubular structures 180 (also referred to herein as manufacturing process 100 and/or process 100) provides for the sheet metal supply coils 105 to be loaded onto a mandrel 115 of an uncoiler apparatus 110 that supports the sheet metal supply coils 105 (also referred to herein as supply coils 105) while rotating them in the direction, R, that unwinds the sheet metal 120 disposed convolutely about the supply coil 105 and feeds the sheet metal 120 to downstream processing operations. The exterior circumferential surface of the supply coil 105 can be supported by rollers 125 positioned underneath the supply coil 105 where the longitudinal axis of each support roller 125 is parallel to the longitudinal axis 130 of the supply coil 105. Each support roller 125 may be driven to rotate and unwind the supply coil 105.

A support mandrel 115 may be inserted through the core of the supply coil 105. The support mandrel(s) 115 can be inserted into a respective supply coil 105 and affixed to the uncoiler apparatus 110 core via mounting arms 135 sized to engage both ends of the core of the supply coil 105. Both ends of the support mandrel 115 may be supported within the uncoiler apparatus 110 and the mandrel may be connected to a motor to rotate the supply coil 105 and unwind the sheet metal 120. Both support rollers 125 and a support mandrel 115 may be used to support the supply coil 105. Other uncoiling or unwinding apparatus configurations known to those of skill in the art may also be used to perform the supply coil 105 unwinding operation.

Sheet Metal Conveying and Web Handling

After the sheet metal 120 is unwound from the supply coil 105, it is conveyed through downstream operations until it is wound in the recoiler 150 to create the desired tubular structure 180. Driven or non-driven rollers 140 and stationary supports 145 may be used to support and convey the sheet metal 120 while defining the web path throughout the manufacturing process 100. In a preferred embodiment, the sheet metal 120 processing components are mounted such that their longitudinal axes are level within relatively close tolerances (e.g., level across the entire length+/−0.002 inches or +/−0.051 mm) to ensure consistent tracking of the sheet metal 120 throughout the manufacturing process 100.

In a preferred embodiment, all sheet metal 120 processing components used in the manufacturing process 100 are mounted with their longitudinal axes parallel to one another within relatively close tolerances (e.g. +/−0.002 inches or +/−0.051 mm) to provide consistent tracking of the sheet metal 120 throughout the manufacturing process 100. Tension of the sheet metal 120 can be controlled to provide uniform processing operations. Suitable tension control methods known in the art include, but are not limited to, sheet metal accumulation zones (e.g., a single accumulation loop within a pit between unit operations), sheet metal festoon accumulators, dancers, and load cells which may be used to regulate relative speeds between consecutive unit operations. Other sheet metal tension control techniques known to those of skill in the art may also be used.

In a preferred embodiment, the sheet metal 120 tension can be controlled with load cells 155 that detect the tension and force within the sheet metal 120 at desired location(s) within the process 100, comparing the force to a target, and adjusting the relative speed of any adjacent sheet metal 120 conveying devices used in the manufacturing process 100 to maintain the target force and tension within the sheet metal 120. In this regard, one of skill in the art can provide a suitable tension control algorithm that compares an actual tension in the sheet metal 120 with a desired target tension to determine a tension adjustment factor. The tension adjustment factor can then be applied to the manufacturing process 100 equipment to provide for an adjustment of the speed of the sheet metal 120 by process control equipment to provide for a corrected sheet metal 120 speed and thereby adjust the sheet metal 120 tension. Such a process can be accomplished in-situ or by any off-line process suitable for one of skill in the art.

Winding Mandrels

The process 100 for making tubular structures 180 provides for a sheet metal 120 to be attached to a winding mandrel 160 (mandrel 160). The winding mandrel 160 is a replaceable support that defines the interior cross sectional shape and size of the desired tubular structure 180. The mandrel 160 may be fabricated to provide the desired length, cross-sectional shape, and cross-sectional dimensions of the tubular structure 180 to be produced. The mandrel 160 can be slightly longer than the width of the sheet metal 120 used to form the tubular structure 180. The mandrel 160 shape may be selected to provide the desired cross-sectional shape of the interior of the tubular structure 180, including but not limited to, circular, rectangular, or square. The cross-sectional dimensions of the mandrel 160 may be selected to provide the desired interior cross-sectional dimensions of the tubular structure 180. For example, the mandrel 160 may be circular and have an outside diameter equal to 1 inch. Alternatively, the mandrel 160 may be circular and have an outside diameter equal to 100 inches. Yet still, the mandrel 160 may be rectangular and comprise outside dimensions equal to 30 inches by 20 inches. The mandrel 160 design is very flexible and can provide a very wide range of tubular structure 180 interior cross sectional shapes and sizes, thereby eliminating a major constraint in prior art fabrication processes for tubular structures 180.

Mandrel 160 is preferably designed to provide for the leading edge 175 of the sheet metal 120 forming tubular structure 180 to be disposed thereupon and/or attached thereto. Any adherence force should be sufficient to maintain the desired sheet handling tension and prevent slippage between the sheet metal 120 and the mandrel 160 surface as the sheet metal 120 is convolutely disposed about the mandrel 160 in the first revolution as the winding process 100 begins.

Vacuum ports can be provided within the surface of the mandrel 160. The force exerted by the vacuum level may be sufficient to provide the desired holding force between the sheet metal 120 and the mandrel 160. The vacuum force may be maintained for the initial portion of the process 100 and then turned off when no longer needed. After the winding process 100 is complete, positive air pressure may be provided through the ports to enable removal of the convolutely wound tubular structure 180 from the winding mandrel 160.

A first end of the mandrel 160 can be coupled to a motor to provide the rotation force for the winding process 100. The second end distal from the first end of the mandrel 160 can be supported throughout the winding process 100. The second end support can be disengaged and repositioned a sufficient distance to remove the convolutely wound tubular structure 180 from the mandrel 160 after the winding process 100 is complete.

Mandrels 160 can be fabricated from a wide range of materials and by using methods known in the art. Using fabrication capabilities known in the art, mandrels 160 may be produced to provide the desired tubular structure interior dimension to a very accurate level. For example, the mandrel 160 length and cross sectional dimensions can be +/−0.001 inches (+/−0.025 mm) from the target. Mandrels 160 can be made for each desired cross sectional shape and size combination and re-used during production of tubular structures 180 to have the desired interior cross-sectional shape and size.

Adjustable geometry mandrels comprising similar interior cross-sectional shapes but with different sizes throughout a significant range may be used to produce tubular structures 180. For example, an adjustable circular arbor mandrel, known to one of skill in the art, may be used during the production of round tubular structures 180 having an interior diameter ranging from 12 inches to 16 inches.

Center Winding

Figure 14:
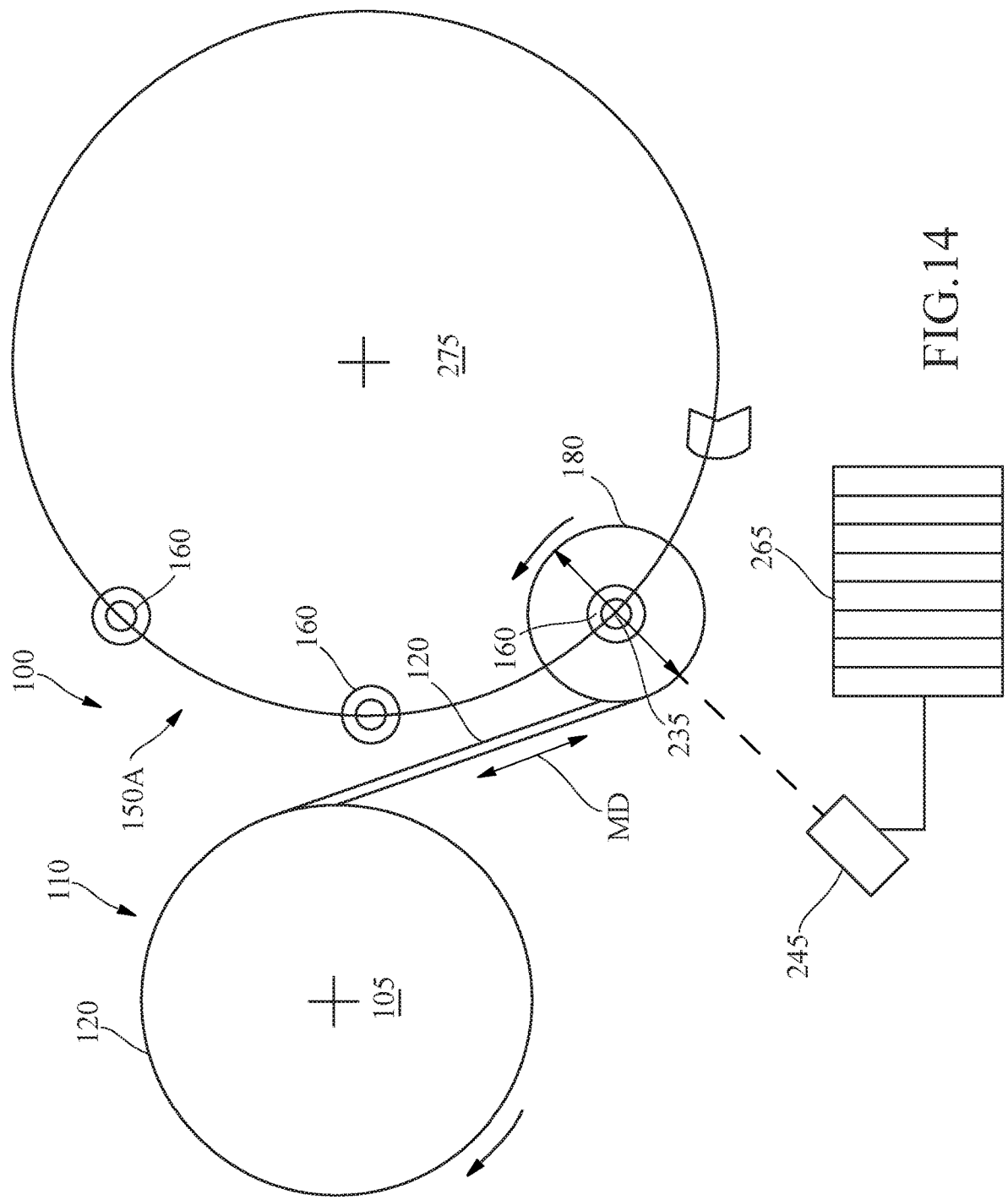
FIG. 14 is a side elevational view of another process for the manufacture of a tubular structure.

As shown in FIG. 14, one embodiment of the process 100 for making tubular structures 180 provides for a tubular structure 180 to be formed by convolutely winding a sheet metal 120 about the longitudinal axis of the tubular structure 235 while the winding force is transmitted from a motor to a winding mandrel 160. In this configuration, known in the art as center winding, the rotating speed of the mandrel 160 is controlled to provide a uniform surface speed at the point where the incoming sheet metal 120 first contacts the winding tubular structure 180, from the beginning of the winding cycle through the completion of the winding cycle.

Recoiler 150A can provide for a plurality of mandrels 160 to be disposed upon a turret 275 that is rotatable about a rotational axis. In this manner, a sheet metal 120 supplied from supply coil 105 from uncoiler 110 can be convolutely wound about a first mandrel 160 while a second mandrel 160 is disposed in a position to receive sheet metal 120 after the tubular structure 180 disposed upon the first mandrel 160 is complete and rotated away from a defined winding position. In other words, when the tubular structure 180 being formed from sheet metal 120 about a first mandrel 160 disposed upon the turret 275 is completed (e.g., has attained a desired thickness), the sheet metal 120 can be severed forming a first tail portion, the first tail portion can be attached to the previous convolution of tubular structure 180, the mandrel 160 having the tubular structure 180 disposed thereabout can be rotated away from a winding position, turret 275 can be rotated about its rotational axis to position a new mandrel 160 into the winding position, and the leading edge of the severed sheet metal 120 can be fixably disposed upon, or attached to, the new mandrel 160. This can provide a nearly continuous production of tubular structures 180.

The desired speed profile can be pre-calculated for a given tubular structure 180 geometry. The variables that define the speed profile include the sheet metal 120 incoming speed, the tubular structure 180 interior cross-sectional dimension, the tubular structure 180 exterior cross-sectional dimension, and the thickness of the sheet metal 120 being wound. In embodiments where the sheet metal 120 is deformed out-of-plane for portions of the tubular structure 180 wall, the average in-wound thickness of the deformed sheet metal 120 (which may include some compression) is used for the thickness value for that portion of the speed profile.

A laser measurement system 245 (or any measurement system) can be used to measure the outer diameter of the tubular structure 180 as it is being wound. A controller 265 can be operatively and/or communicatively coupled to the laser measurement system 245 as well as the equipment associated with the formation of tubular structure 180 to control when each discrete unit operation is activated or deactivated during the tubular structure 180 formation process.

For example, a tubular structure 180 can be a circular pipe having an inside diameter of 12 inches and an outside diameter of 16 inches. The incoming sheet metal 120 is undeformed, has a uniform thickness of 0.020 inches, and has a speed at the recoiler 150 of 500 feet per minute. The wall thickness of the pipe (i.e., tubular structure 180) may be calculated using the formula:

(Outside Diameter−Inside Diameter)/2 Sides

In this example: (16 inches−12 inches)/2=2 inches
The number of mandrel 160 revolutions required to form the pipe may be calculated using the formula:

Wall Thickness/Sheet Metal Thickness

In this example: 2 inches/0.020 inches=100 revolutions
The outside diameter of the winding pipe after "Y" revolutions may be calculated using the formula:

Inside Diameter+(Y×Sheet Thickness×2 Sides)

In this example after 10 revolutions: 12 inches+(10×0.020 inches×2)=12.4 inches
In this example after 50 revolutions: 12 inches+(50×0.020 inches×2)=14 inches
In this example after 100 revolutions: 12 inches+(100×0.020 inches×2)=16 inches
The required rotational speed of the mandrel 160 to maintain a uniform surface speed at the point where the incoming sheet metal first contacts the winding tubular structure 180 may be calculated using the formula:

Mandrel Revolutions per Minute (RPM)=Incoming Sheet Metal Speed (feet per minute)/Tubular Structure Perimeter (feet) at that point in the winding cycle After 0 revolutions: Mandrel RPM=500/(12 inches×π/12 inches/feet)=159.15

After 10 revolutions: Mandrel RPM=500/(12.4 inches×π/12 inches/feet)=154.02

After 50 revolutions: Mandrel RPM=500/(14 inches×π/12 inches/feet)=136.41

After 100 revolutions: Mandrel RPM=500/(16 inches×π/12 inches/feet)=119.37

One of skill in the art may use such calculations to create a target speed profile for all points in the process 100 for the tubular structure 160. Motor controllers known in the art may use such speed profiles to regulate the motor and mandrel 160 rotational speeds at all points throughout the winding cycle, thereby providing a reliable means for winding the desired tubular structure 180.

A similar approach may be used to control the winding speed of a non-circular tubular structure 180, such as one comprising a rectangular or square interior cross-section. The calculations are similar, although the formulae for determining the instantaneous outside diameter or perimeter must be altered to account for the difference in geometry between the desired interior cross-section and the circular cross-sectional example described above.

Surface Winding

Figure 15:
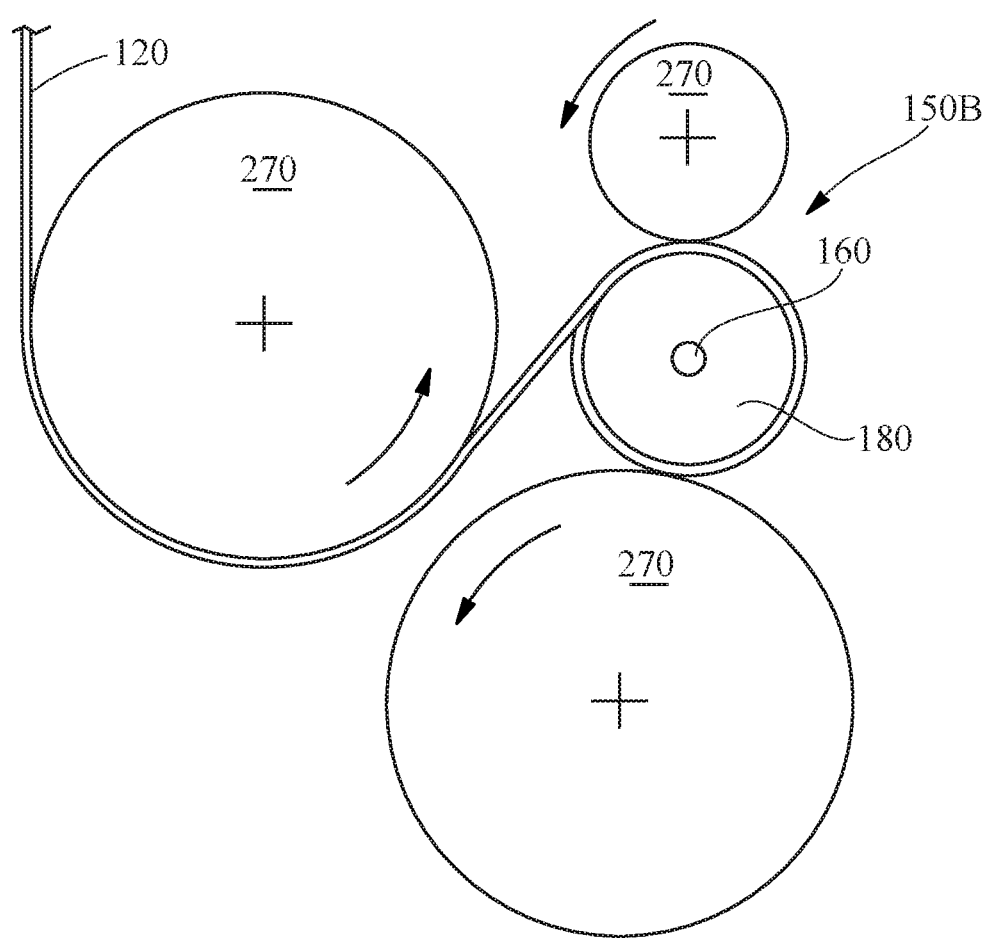
FIG. 15 is a side elevational view of still another exemplary recoiler.

As shown in FIG. 15, an alternative embodiment of a process 100 for making tubular structures 180 provides for a tubular structure 180 to be formed by convolutely winding a sheet metal 120 about the longitudinal axis 235 of the tubular structure 180 while the winding force is transmitted from a motor or motors to at least two winding rollers 270 that contact the surface of the tubular structure 180 as it is being wound. This configuration is known as surface winding as the driving force for winding is provided exclusively through the surface of the tubular structure 180 as it is wound. Three winding rollers 270 contact and provide a driving force to the surface of the winding tubular structure 180. Two of the winding rollers 270 may be positioned underneath the winding tubular structure 180 and spaced apart a distance to provide a stable cradle-like support system. A third winding roller 270 may be positioned to contact the tubular structure 180 at or near its uppermost perimeter. The longitudinal axes of the three winding rollers 270 are generally parallel to the longitudinal axis 235 of the winding tubular structure 180. All three winding rollers 270 can be driven by one or separate motors to provide matched surface speeds. All three winding rollers 270 can be mounted in a manner which allows enough movement to maintain contact with the increasing outer dimensions of the winding tubular structure 180 throughout the entirety of the winding process 100. The third winding roller 270 can be provided with a capability to exert a substantial force generally perpendicular to the sheet metal 120 being wound and compress the sheet metal 120 against the winding tubular structure 180. Further, each of the three winding rollers 270 may be provided with a relatively rigid surface (e.g., metal), a deformable surface (e.g., a rubber cover), or any desirable combination thereof.

The three winding roller 270 configuration described above can work well when winding circular tubular structures 180. The surface winding system has limitations, however, when winding non-circular tubular structures 180. The significant outer dimension position variations within each revolution inherent with such non-circular structures can require relatively complex and simultaneous movement of the three winding rollers 270 to maintain contact with the outer surface of the winding tubular structure 180. Center winding or hybrid winding processes may be better suited for the production of non-circular tubular structures 180.

Hybrid Winding

Figure 16:
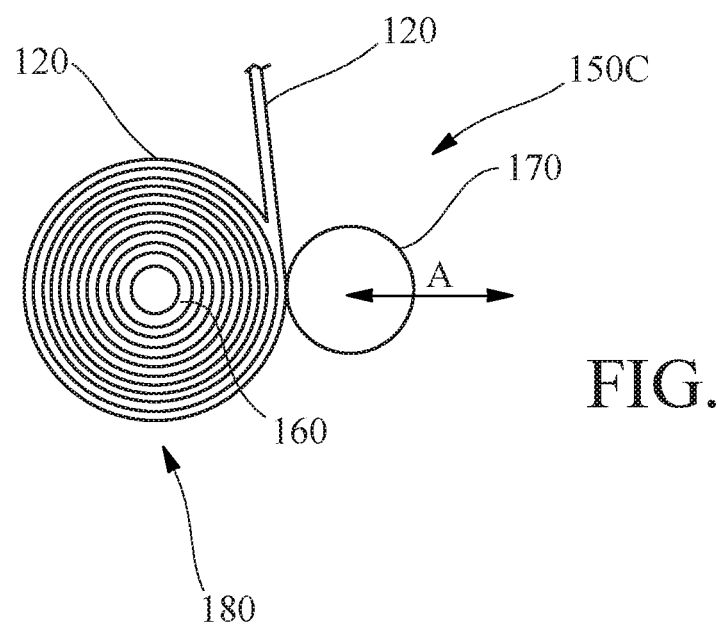
FIG. 16 is a side elevational view of yet another exemplary recoiler.
Figure 17:
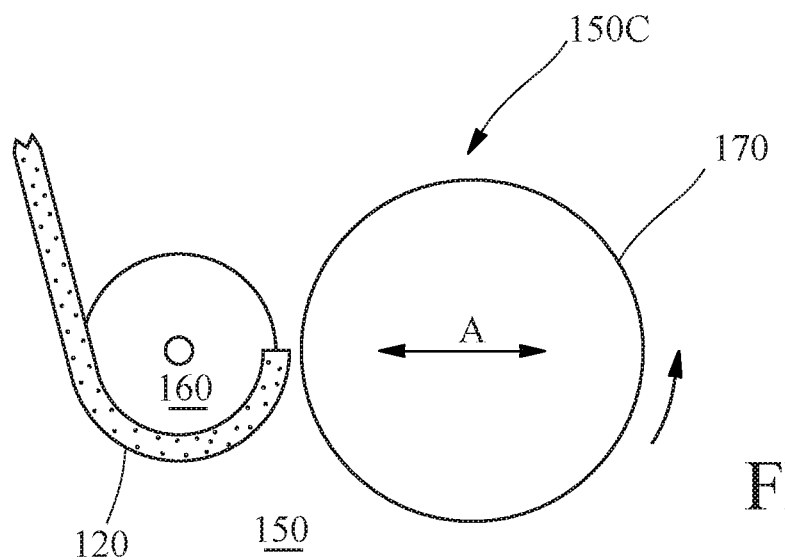
FIG. 17 is a side elevational view of an alternative recoiler.
Figure 18:
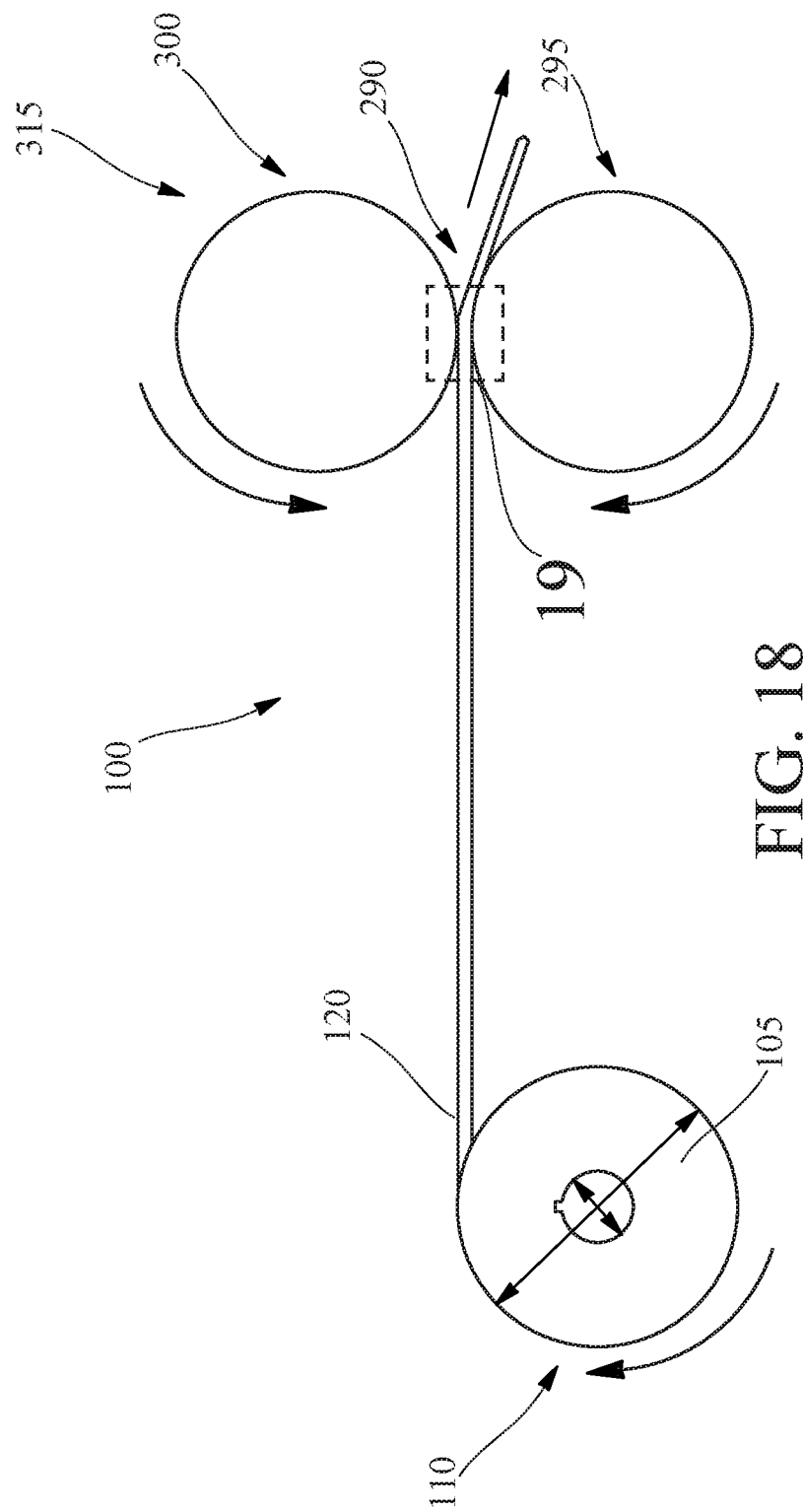
FIG. 18 is a side elevational view of an exemplary process for creating protuberances and recesses in sheet metal.
Figure 19:
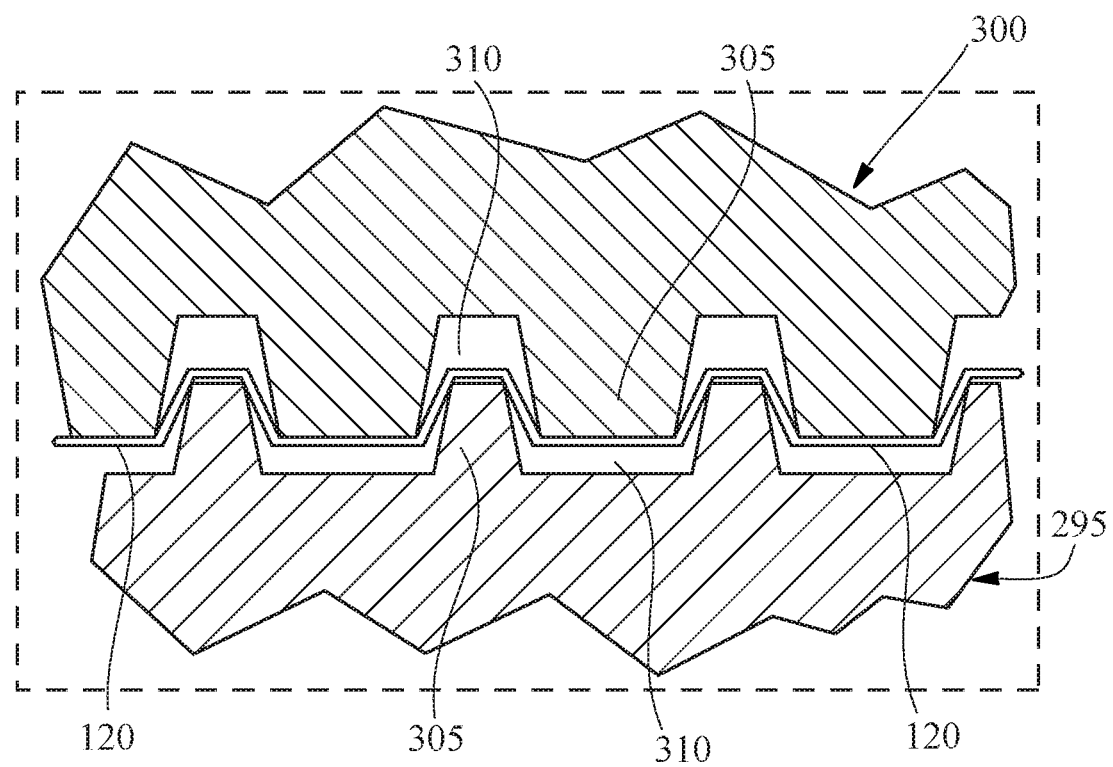
FIG. 19 is an expanded view of the region labelled 19 in FIG. 18.
Figure 20:
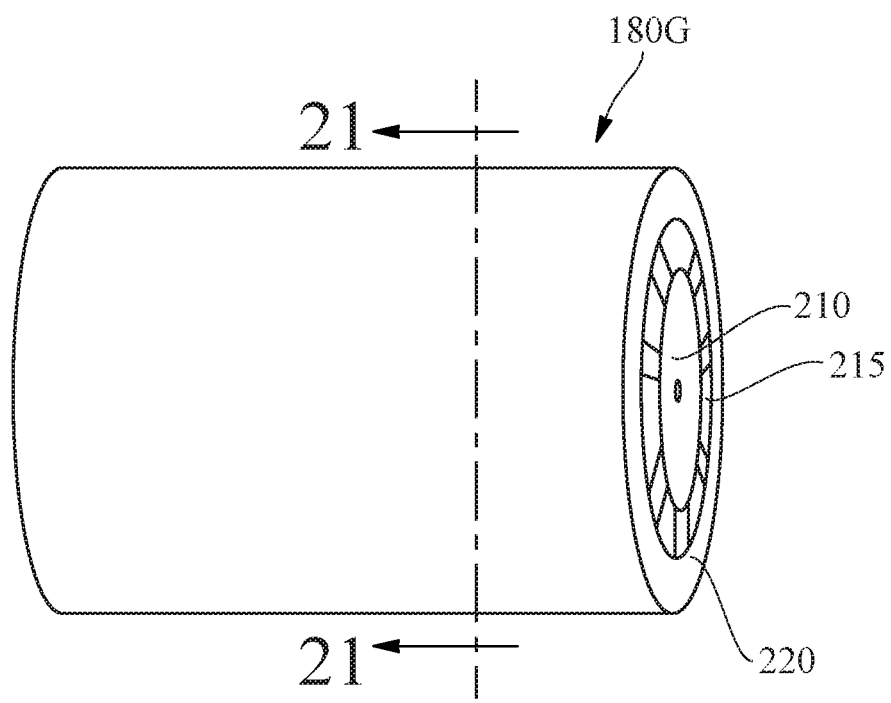
FIG. 20 is a perspective view of still another convolutely wound tubular structure.
Figure 21:
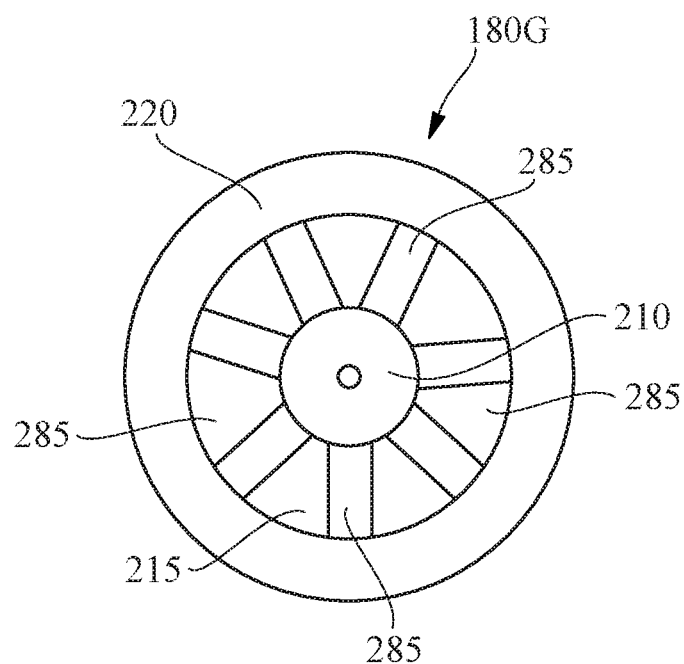
FIG. 21 is a cross-sectional view of the convolutely wound tubular structure of FIG. 20 taken along lines 21-21.

As shown in FIGS. 16-17, another alternative embodiment of a process 100 for making tubular structures 180 provides for a tubular structure 180 to be formed by recoiler 150C that convolutely winds a sheet metal 120 about the longitudinal axis of the tubular structure 235 while the winding force is transmitted from a motor to a winding mandrel 160 disposed upon turret 275. A supplemental driving force is transmitted to the exterior surface of the tubular structure 180 by a driven rider roll (i.e., adjustable pressure roll 170). This configuration is known as hybrid winding as it combines elements of center winding with a surface driven component. The position of adjustable pressure roll 170 is adjusted in the direction, A, to provide enough pressure upon the sheet metal 120 being convolutely wound about mandrel 160 to provide a desired winding pressure upon tubular structure 180 as it is being formed. In addition to providing supplemental driving force to the winding tubular structure 180, the adjustable pressure roll 170 may be loaded against the tubular structure 180 with substantial force. This perpendicular force applicable in a direction, A, relative to tubular structure 180, may provide an improved bonding force when adhesive is used to bond adjacent layers of sheet metal 120. The perpendicular force may also ensure uniform contact between the incoming sheet metal 120 and the winding tubular structure 180 by forcing out entrained air and preventing side-to-side wandering of the incoming sheet metal 120.

In the hybrid winding configuration 150C, the rotational speed of the mandrel 160 is controlled throughout the winding process as described in the above center winding description. The adjustable pressure roll 170 in this winding configuration is mounted with its longitudinal axis parallel to the longitudinal axis of the mandrel 160. The adjustable pressure roll 170 may be selected to have a suitable diameter to minimize deflection during operation, wherein it exerts a substantial force that is generally orthogonal to the winding sheet metal 120. The mounting configuration of the adjustable pressure roll 170 should allow sufficient movement so that contact between the adjustable pressure roll 170 and the tubular structure 180 may be maintained through the entirety of the winding cycle, from minimum tubular structure 180 exterior geometrical dimensions to maximum tubular structure 180 exterior geometrical dimensions.

The bearing housings at each end of the adjustable pressure roll 170 are mounted to arms that are connected via pivot pins to a frame. Linear actuators can be used to control movement of each end of the adjustable pressure roll 170, around the corresponding pivot, to produce a compressive loading force between the sheet metal 120 and the winding tubular structure 180. In a preferred embodiment, the adjustable pressure roll 170 contacts the winding tubular structure 180 at or slightly downstream of the tangent point of the incoming sheet metal 120. Further, the adjustable pressure roll 170 loading force against the winding tubular structure 180 can be controlled to a desired level and maintained at that level throughout the entirety of the winding process. Linear actuators can provide a suitable means for independently controlling the loading force at both ends of the adjustable pressure roll 170 assembly.

The adjustable pressure roll 170 can have a relatively rigid surface, such as metal, or a deformable surface, such as a rubber cover. The adjustable pressure roll 170 can be driven by a motor that maintains a matched or nearly matched surface speed between the surface of the adjustable pressure roll 170 and the surface speed of the winding tubular structure 180.

Helical (Offset) Winding

Additionally, sheet metal 120 can be convolutely wound about a longitudinal axis offset at an angle substantially less than 90 degrees relative to the machine direction centerline of the incoming sheet metal 120. This winding configuration can be known as helical, or offset, winding.

Multiple, relatively narrow strips of sheet metal 120 are fed onto a stationary mandrel 160 at a relative angle of approximately 45 degrees. Each strip of sheet metal 120 is wound so adjacent edges are in edge-to-edge contact, leaving no significant gap between adjacent sheet edges and no overlap with the preceding wound strip. Flexible narrow belts are driven by a motor and are wrapped around a significant portion of the winding strips to provide surface driven rotation of the winding sheet metal strips around the mandrel 160 and simultaneous translation of the winding tubular structure toward the downstream end of the mandrel.

Each sheet metal strip forms a layer of the desired tubular structure 180. Separate metal strips and related uncoiling and web handling processes can be required for each sheet metal strip. This manufacturing method can provide an essentially endless stream of formed tubular structure 180 with final lengths determined by downstream cut-off systems. This may be an especially efficient manufacturing method for tubular structures 180 comprising relatively few layers, especially when extended length tubular structures 180 are required, or when very high total lengths of tubular structures 180 are required.

Such a helical winding process may require that any seams and edges be sealed for applications with even modest levels of internal pressure. The required joining of adjacent layers of sheet metal 120 and sealing of the sheet metal 120 edges and seams may be provided by adhesive bonding systems or welding systems described infra.

Interior Dimension, Wall Thickness, and Outer Dimension Flexibility and Accuracy A key advantage of the current invention relative to prior art is the unprecedented flexibility to produce tubular structures 180 with a very wide range of interior dimension, wall thickness, and exterior dimension combinations. As described supra, nearly any desired tubular structure 180 interior cross sectional shape and size can be provided by an appropriately designed winding mandrel 160. Once the winding process 100 is initiated by wrapping the incoming sheet metal 120 around the winding mandrel 160, the winding process 100 continues until the desired wall thickness and exterior dimensions are produced, at which point the winding process is terminated, and the sheet metal 120 is cut off. The winding process 100 can be easily terminated only a few winding revolutions after the start of the winding process, thereby producing a relatively thin wall. If desired, the winding process 100 may also continue for a relatively extended period after the winding process 100 is initiated before the process 100 is terminated, and the sheet metal 120 is cut off. In this latter method, a very thick wall tubular structure 180 may be produced.

In one embodiment, the outer dimensions of the winding tubular structure 180 can be measured throughout the entire winding process 100. Measurement systems are known in the art to continuously measure the outer dimensions of the winding tubular structure 180. For example, a digital micrometer can contact the winding structure and provide an accurate measurement (+/−0.001 inches or 0.025 mm) of the wound wall thickness. Further, non-contact laser triangulation measurement systems can be used to scan the winding tubular structure 180 and provide an accurate measurement (within 0.001 inches or within 0.025 mm) of the wound wall thickness. Measurement systems may be used to monitor the winding process 100 and provide a winding termination signal when a target wall thickness and corresponding outer dimensions of a tubular structure 180 have been produced.

The process 100 can provide both unprecedented flexibility for the cross-sectional shape and size of tubular structures 180 and very accurate production of the desired interior cross sectional dimensions, wall thickness, and cross sectional exterior dimensions. All three parameters may be controlled within very tight tolerances over a wide size range. Presume a round pipe having a target 30.000 inch inside diameter, a 36.000 outside diameter, and a corresponding wall thickness of 3.000 inches is desired. A sheet metal 120 with a uniform thickness of 0.030 inches is used to form the pipe. A mandrel 160 with an outside diameter of 30.000 inches is used for producing the pipe. The sheet metal 120 is wound around the mandrel 160 using a hybrid winding process. A laser triangulation system can monitor the wall thickness from the start of the process 100 until the target of 3.000 inches is produced, at which point the process 100 is terminated, and the sheet metal 120 is cut off. Here, the pipe will have approximately 100 revolutions of sheet metal to form the wall (3.000 inch wall/0.030 inch thick sheet metal). The final pipe will be at or very close to the target dimensions for inside diameter, wall thickness, and outside diameter. Expected dimensional variations in these parameters is less than +/−0.1% of the target dimension.

A source of minor variation for the inside diameter, wall thickness, and outside diameter is the leading and trailing edge of the sheet metal 120 used to form the pipe. The inside diameter of the pipe measured just downstream of the leading edge of sheet metal 120 may measure 30.000 inches. The same measurement taken just upstream of the leading edge 175 may be approximately 30.030 inches due to the thickness of the sheet metal 180 leading edge 175. A similar effect may be found on the exterior of the pipe at the trailing edge of the sheet metal 120. This variation in dimensional accuracy may be mitigated by using a thinner sheet metal 120 for the inner and outer portions of the tubular structure 180. For example, the first few layers and last few layers of the pipe may be formed using a sheet metal 120 comprising a relatively small thickness of 0.003 inches, thus reducing approximately 90% of the minor dimensional variation. In a second embodiment, the leading edge 175 of the sheet metal 120 may be bevel ground or machined by means known in the art to eliminate the step and provide a very thin, blended-in edge prior to wrapping the sheet metal 120 around the mandrel 160 and initiating the winding process 100. The trailing edge 175 of the sheet metal 120 may be similarly ground or machined after the process 100 is completed. A grinding or machining operation can also eliminate approximately 90% of a minor dimensional variation. Using one, or both, of these methods can further improve the accuracy of the produced tubular structure 180. It is preferable that any minor variations associated with the sheet metal 120 ends in wound tubular structures 180 be mitigated so that, for example, the actual inside diameter, wall thickness, and outside diameter variances from their respective targets are all less than +/−0.1% of target. It is more preferable that the actual inside diameter, wall thickness, and outside diameter variances from their respective targets are all less than +/−0.01% of target.

Additionally, the structure of the produced tubular structure 180 can be further enhanced by providing a secondary convolute winding. Such a process can increase wall thickness of the tubular structure 180, provide a change in the outer material comprising the tubular structure 180, as well as improve the appearance of the produced tubular structure 180. By way of example, a secondary convolute winding can be provided to the tubular structure 180 by first attaching the leading edge 175 of the second sheet metal 120 to the tubular structure 180 at a position proximate to but not overlapping the trailing edge 175 of the first sheet metal 175. Appropriate bonding may be provided between the respective layers of the first sheet metal 120 and second sheet metal 120 to provide the necessary structural integrity as a desired number of additional layers of second sheet metal 120 are wound onto tubular structure 180. In other words, an additional wind to the convolutely wound structure is provided after the fact.

Cross-Machine Direction Registration of Sheet Metal Features

In a preferred embodiment, features of convolutely wound tubular structures 180 may be aligned in the cross-machine direction to maintain relative registration along the tubular structure 180 longitudinal axis 235. For example, discrete voids 230 can be created with a void generation system 240 in the sheet metal 120 by laser cutting prior to winding. The cross-machine direction spacing of the voids 230 can be controlled to ensure the voids 230 are aligned axially after being wound into the tubular structure 180. To ensure the voids 230 remain aligned, means can be implemented to maintain cross-machine direction alignment of such features from the point they are generated in the sheet metal 120 until they are wound into the tubular structure 180.

In one embodiment, in-line leveler and sheet metal 120 tension control mechanisms known in the art can be used to provide a smooth, level sheet under consistent tension. Consistent tension may be maintained from the point where a sheet metal 120 feature such as voids 230 are produced through the manufacturing process 100. In addition, sheet spreading devices such as herringbone spreader rolls and bowed spreader rolls, both known in the art, may be used to spread the sheet metal 120 to further ensure the surface is flat and smooth.

The overall width of the sheet metal 120 may be continuously measured by monitoring the sheet edge position with a non-contact device such as ultrasonic or infrared scanners, both known in the art, at each side of the sheet metal 120. The same devices may be used to compare the sheet edge position to a desired edge position. This information can be used to control an uncoiler 110 sidelay device, known in the art to be capable of moving the supply coil 105 of sheet metal 120 in the cross machine direction, to maintain a centered sheet alignment or to maintain one sheet edge at a target cross machine position.

Any combination of the above devices may be used to control the sheet metal 120 as it is processed. In a preferred embodiment, all the mechanisms are used to maintain a smooth, flat sheet metal 120 surface, control the sheet tension to a uniform level, and align at least one sheet edge to a target cross machine position. The cross-machine direction alignment of sheet features may be controlled and maintained from the point they are introduced into the sheet metal 120 until they are wound into the tubular structure 180 in the recoiler 150.

Machine Direction Registration of Sheet Metal Features

The machine direction spacing of some features of convolutely wound tubular structures 180 may be controlled to maintain relative registration in the circumferential direction within a rewound tubular structure 180. For example, if discrete circular voids are created in the sheet metal by laser cutting prior to winding into a circular pipe, the machine direction spacing of the voids can be continuously adjusted to maintain circumferential registration of the voids after being wound. Maintaining the machine direction spacing of such features from the point they are generated in the sheet until they are wound into the pipe can ensure the voids remain aligned.

The machine direction spacing of discrete circular voids can be increased from the first generated void to each successive void within the pipe. The increase in machine direction spacing between a first void and a second successive void that overlies the first void may be pre-determined and based on the thickness of the sheet metal and the diameter of the pipe at that point in the winding process. The circumferential spacing of successive voids can increase according to the increase in the structure's diameter at that point in the wind. The circumference of the pipe at any point in the wind may be determined by the formula:

$$\text{Pipe Circumference} = \text{Pipe Diameter} \times \pi$$

The increase in pipe diameter from a first layer to a successive layer may be determined by the formula:

$$\text{Pipe Diameter (2)} = \text{Pipe Diameter (1)} + (\text{Sheet Metal Thickness} \times 2 \text{ sides})$$

Once the circumferential spacing increase has been determined, the activation timing of the laser that creates the void may be appropriately adjusted.

One skilled in the art may use this procedure, or a suitably modified procedure, to control the machine direction spacing of sheet metal features to maintain any desired circumferential registration of such features once they are rewound into a tubular structure.

Edge Slitting/Width Control/Shaped End Faces

Figure 2:
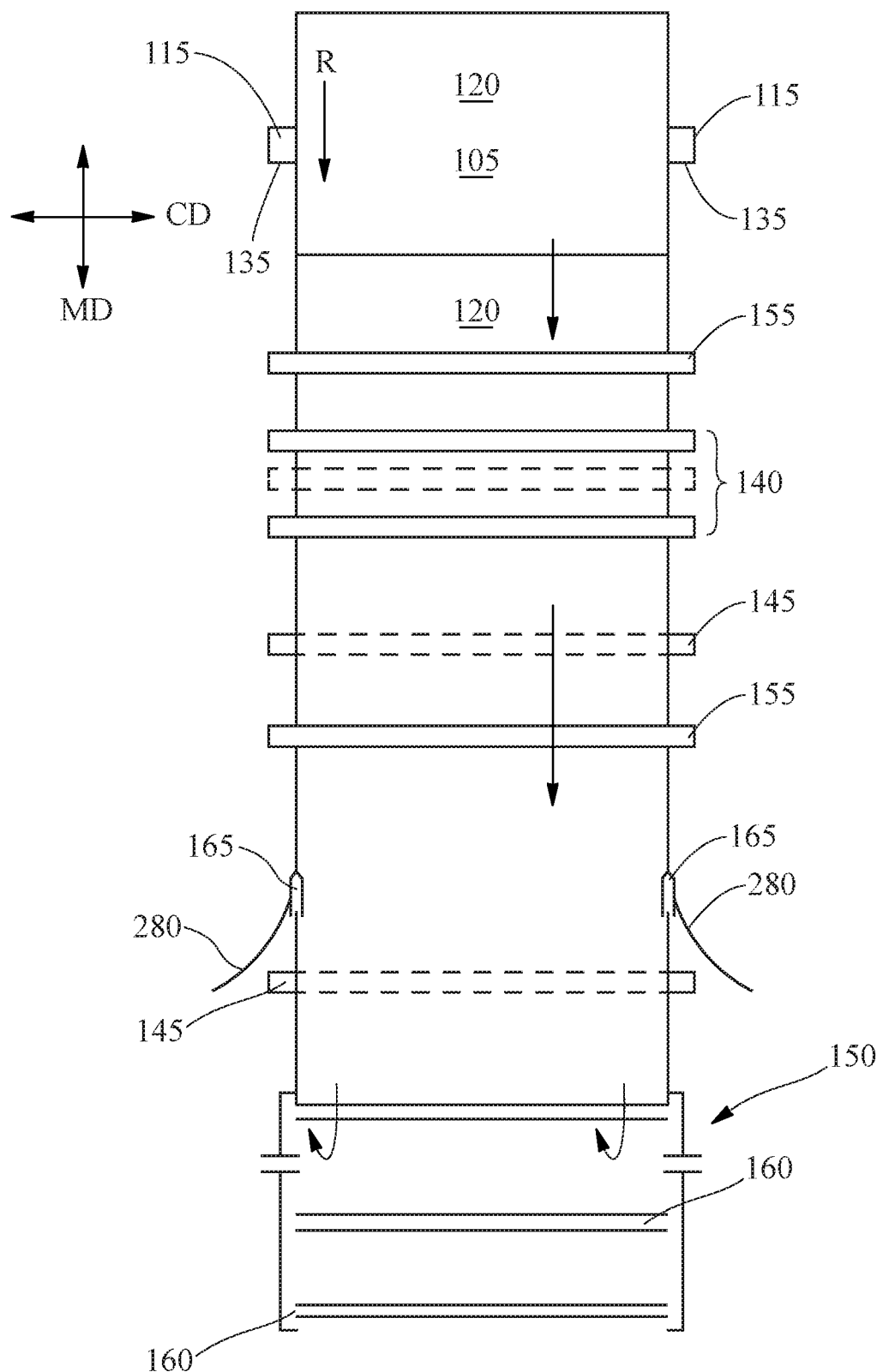
FIG. 2 is a plan view of the process for the manufacture of tubular structures of FIG. 1.

Returning to FIGS. 1-2, a sheet metal 120 is unwound from a supply coil 105 and is conveyed in a uniform manner that minimizes cross-machine wandering of the sheet metal 120. The sheet metal 120 is rewound into a tubular structure 180 where the length of the tubular structure 120 is approximately equal to the width of the sheet metal supply coil 105. The sheet metal 120 edges on both sides of the sheet are closely aligned and the end faces of the tubular structure 180 are approximately perpendicular to the longitudinal axis of the tubular structure 180.

Alternatively, a sheet metal 120 can be unwound from a supply coil 105. The sheet metal 120 is conveyed in a uniform manner that minimizes cross-machine wandering of the sheet, the width of the sheet is reduced by edge slitting with an edge slitting process 165, and the sheet metal 120 is rewound into a tubular structure 180. In a preferred embodiment, the edge slitting process 165 occurs downstream of any transformation processes (e.g., void 230 generation) and upstream of the recoiler 150. The edge slitting process 165 may provide a more uniform sheet width, a more uniform tubular structure 180 length, and may eliminate sheet edge defects related to supply coil 105 irregularities and/or damage. A laser cutting apparatus or water jet cutting apparatus, both known in the art, can be used to slit at least one machine direction edge of the sheet metal 120. The cross-machine position of the slitter devices used for edge slitting process 165 may be controlled to any desired position and the position may be continuously adjusted. The slit edges 280 trimmed from the sheet metal 120 may be directed to a collection system on each side of the sheet and disposed or recycled.

Yet still, a sheet metal 120 can be unwound from a supply coil 105 and conveyed in a uniform manner that minimizes cross-machine wandering. The width of the sheet can be reduced by an edge slitting process 165 wherein the magnitude of sheet width reduction is controlled to a desired target corresponding to a subsequent radial position within the tubular structure 180, and the sheet metal 180 is rewound into a tubular structure 180. Both edges of the sheet metal 120 can be slit, and the sheet width gradually reduced from the beginning of the winding process 100 until the completion of the winding process 100. The resulting tubular structure 180 maximum length is at the innermost radial layer, the tubular structure 180 minimum length is at the outermost radial layer, and the tubular structure 180 length decreases in an approximately linear path from the innermost radial layer to the outermost radial layer. The tapered end faces produced by the edge slitting process 165 can be particularly suitable for end-to-end welding of tubular structures 180 to form an extended length assembly, especially when the wall thickness of the tubular structure 180 is relatively high, such as greater than 0.5 inches. Alternatively, the slit width may be controlled to a first target width for the first inner region of a tubular structure 180, a second target width for a second region of a tubular structure 180, and a third target width for a third region of the tubular structure 180. In any regard, any desired sheet width may be produced for any desired radial position within a tubular structure 180 and may produce any desired end face geometrical surface profile for the tubular structure 180.

Multi-Material Construction

A convolutely wound tubular structure 180 can be produced by convolutely winding a single sheet metal 120 on a mandrel 160 that determines the longitudinal axis 235 of the tubular structure 180. A first sheet metal 120A is supplied in a first sheet metal supply coil 105A, unwound, conveyed, and rewound into a desired tubular structure 180 comprised entirely from the first sheet metal 120A. The rewound layers of sheet metal 120A can be constrained by an adjustable pressure roll 170 during or after winding to prevent uncoiling of the resulting rewound tubular structure 180.

As shown in FIGS. 3 and 4, a tubular structure 180, 180B can be produced by sequentially winding at least two sheet metals 120A, 120B comprising different metal materials, on a mandrel 160 that forms the longitudinal axis 235 of a tubular structure 180, 180B. A first sheet metal 120A, comprising a first metal material 200, is supplied in a first supply coil 105A, unwound, conveyed, and rewound into a first inner region 210 of a desired tubular structure 180, 180B. At least a portion of adjacent layers within the first inner region 210 of the desired tubular structure 180, 180A can be adhesively bonded or welded 195 together during the manufacturing process 100. After the first inner region 210 of the tubular structure 180B is wound to the desired thickness, the manufacturing process 100 can be paused and the first sheet metal 120A cut off in the cross-machine direction to form a first tail portion.

A second sheet metal 120B, comprising a second metal material 205, is supplied in a second supply coil 105B. A leading edge 175 of the second sheet metal 120B is prepared with a generally straight edge in the cross-machine direction and conveyed to the recoiler 150 and adhesively bonded or welded 195 to the surface of first metal material 200 (i.e. the first tail portion comprising the outer-most layer of the first inner region 210 of the convolutely wound tubular structure 180B). The second sheet metal 120B is then rewound into a second region 215 of the desired tubular structure 180B. At least a portion of adjacent layers within the second region 215 are adhesively bonded or welded 195 together during the winding process 100.

After the second region 215 of the tubular structure 180B is wound to the desired thickness, the winding process 100 is paused, and the second sheet metal 120B cut off in the cross-machine direction to form a second tail portion. The first metal material 200 comprising the first sheet metal 120A is then supplied by the first supply coil 105A. A leading edge 175 of the first sheet metal 120A is prepared and conveyed to recoiler 150 and attached via an adhesive or welded bond 195 to the outer layer of the second region 215 (i.e., the second tail portion) of the tubular structure 180B. The first sheet metal 120A is then rewound about second region 215 into a third region 220 of the desired tubular structure 180B to a desired thickness. At least a portion of adjacent layers within the third region 220 are adhesively bonded or welded 195 together during the process 100.

Third region 220 can provide the ultimate (e.g., outer) region of tubular structure 180. However, for purposes of this disclosure, it should be understood that third region 220 can reside intermediate any additional regions disposed coaxially thereabout that may be required for the desired tubular structure 180. Merely for purposes of simplicity, this disclosure will refer to tubular structures 180 having a first inner region 210, second region 215, and third region 220 with the understanding that additional regions can be provided as required.

The resulting tubular structure 180B comprises at least a first sheet metal 120A and a second sheet metal 120B. The first sheet metal 120A is used to form the first inner 210 and third 220 regions of the resulting tubular structure 180B and the second sheet metal 120B is used to form the second region 215 of the resulting tubular structure 180B. This multi-metallic form of the tubular structure 180B can offer significant advantages since the first 200 and second 205 metal materials may be independently selected for optimum cost and performance which are best suited for the requirements of the specific region (i.e. inner, middle, or outer) of the convolutely wound tubular structure 180B. For example, stainless steel may be used to provide corrosion resistance for both the interior and exterior regions of a pipe (i.e., first inner region 210 and third region 220) while low cost carbon steel can be used to form the second region 215 of the pipe (i.e., convolutely wound tubular structure 180B), thereby providing desired performance at a lower cost.

Figure 5:
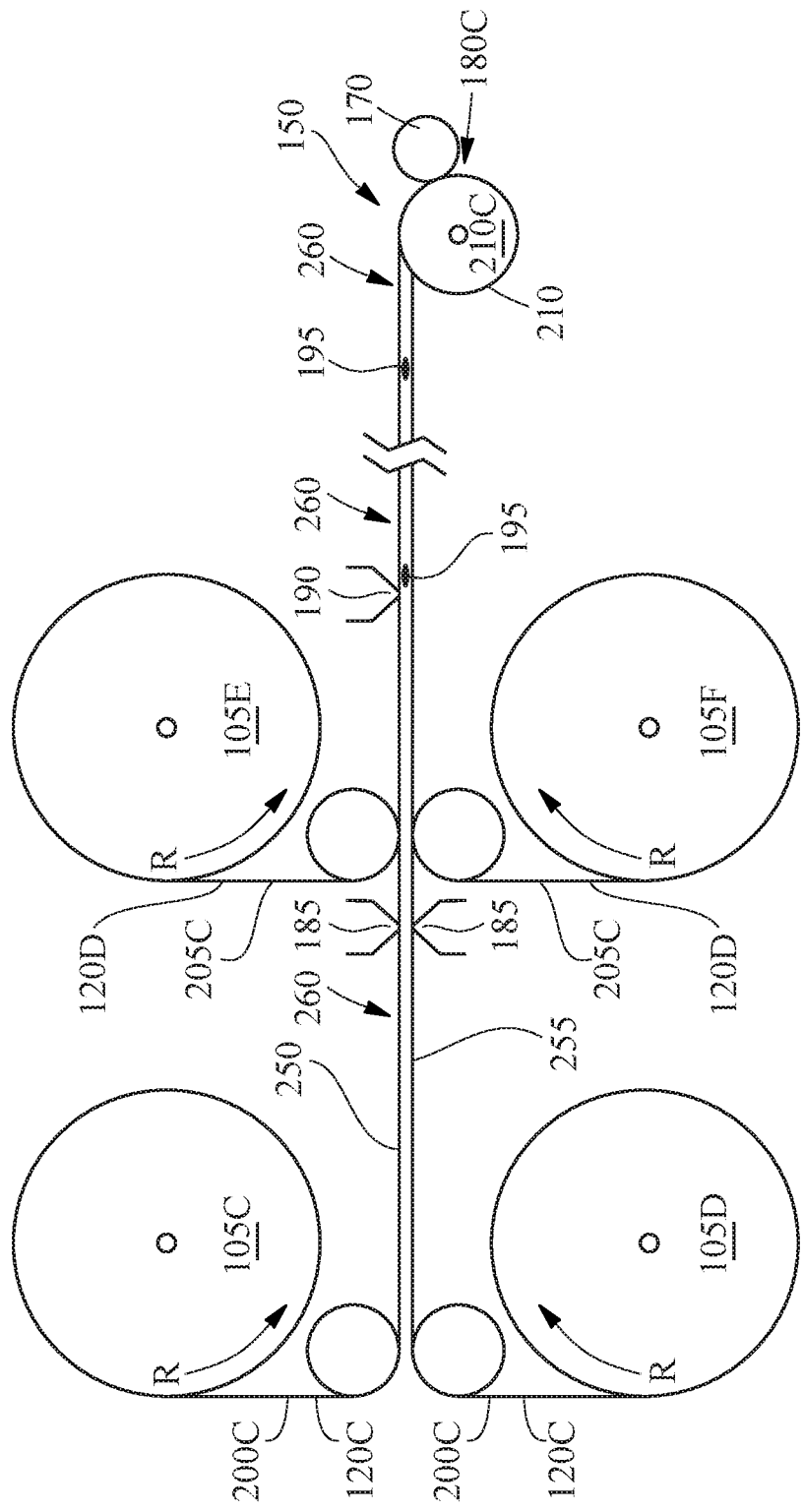
FIG. 5 is a side elevational view of yet another process for the manufacture of a tubular structure.

FIG. 5 provides for a convolutely wound multi-metallic tubular structure 180C to be produced by transitioning between sheet metals upstream of the recoiler 150 winding process. Here, a first ply 250 of a first sheet metal 120C comprising first metal material 200C is unwound from a first sheet metal supply coil 105C. A second ply 255 of the first sheet metal 120C comprising first material 200C is unwound from a second sheet metal supply coil 105 D. The first ply 250 of the first sheet metal 120C and the second ply 255 of the first sheet metal 120C are brought into face-to-face contact and bonded together by bonding process. The bonding process can comprise either adhesive bonding 190 or laser welding 195 to form adhesive bonds, or welded bonds 195. The two-ply sheet metal laminate 260 is then fed into the recoiler 150 where the two-ply sheet metal laminate 260 is wound into a first inner region 210C of the resulting tubular structure 180C.

Figure 6:
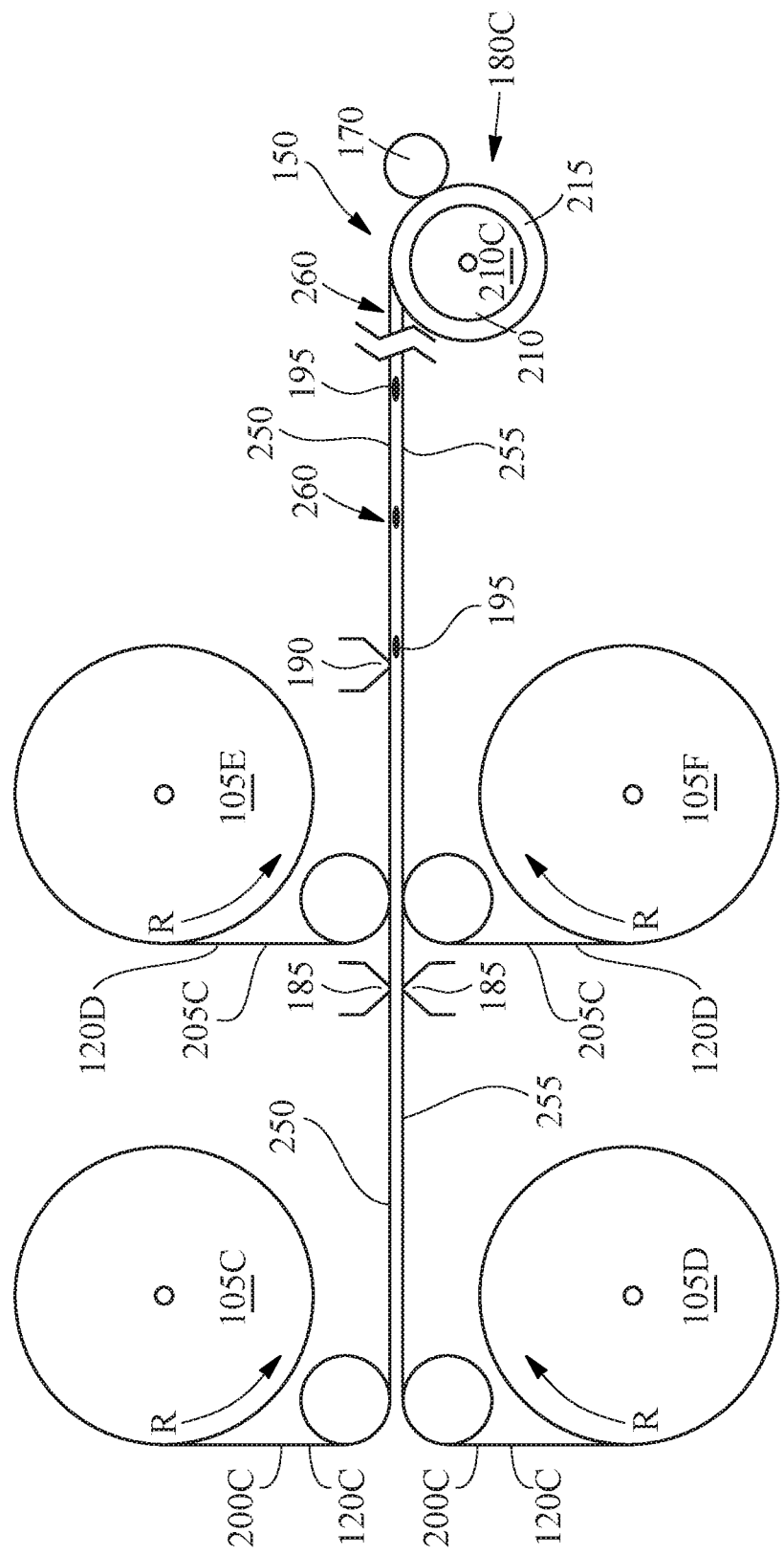
FIG. 6 is a side elevational view of still another process for the manufacture of a tubular structure.

Turning to FIG. 6, the first ply 250 of the first sheet metal 120C is cut off with cut-off device 185 in a cross machine direction at a position upstream of the bonding process. A first ply 250 of a second sheet metal 120D is then unwound from a third supply coil 105E and fed into the bonding process where it is bonded via adhesive bonding 190 or laser welding 195 to form adhesive or welded bonds 195 to the second ply 255 of first sheet metal 120C to form a two-ply sheet metal laminate 260. The two-ply sheet metal laminate 260 is then fed downstream toward the recoiler 150. The two-ply sheet metal laminate 260 is then fed into the recoiler 150 where the two-ply sheet metal laminate 260 is wound into a second region 215 of tubular structure 180C.

Figure 7:
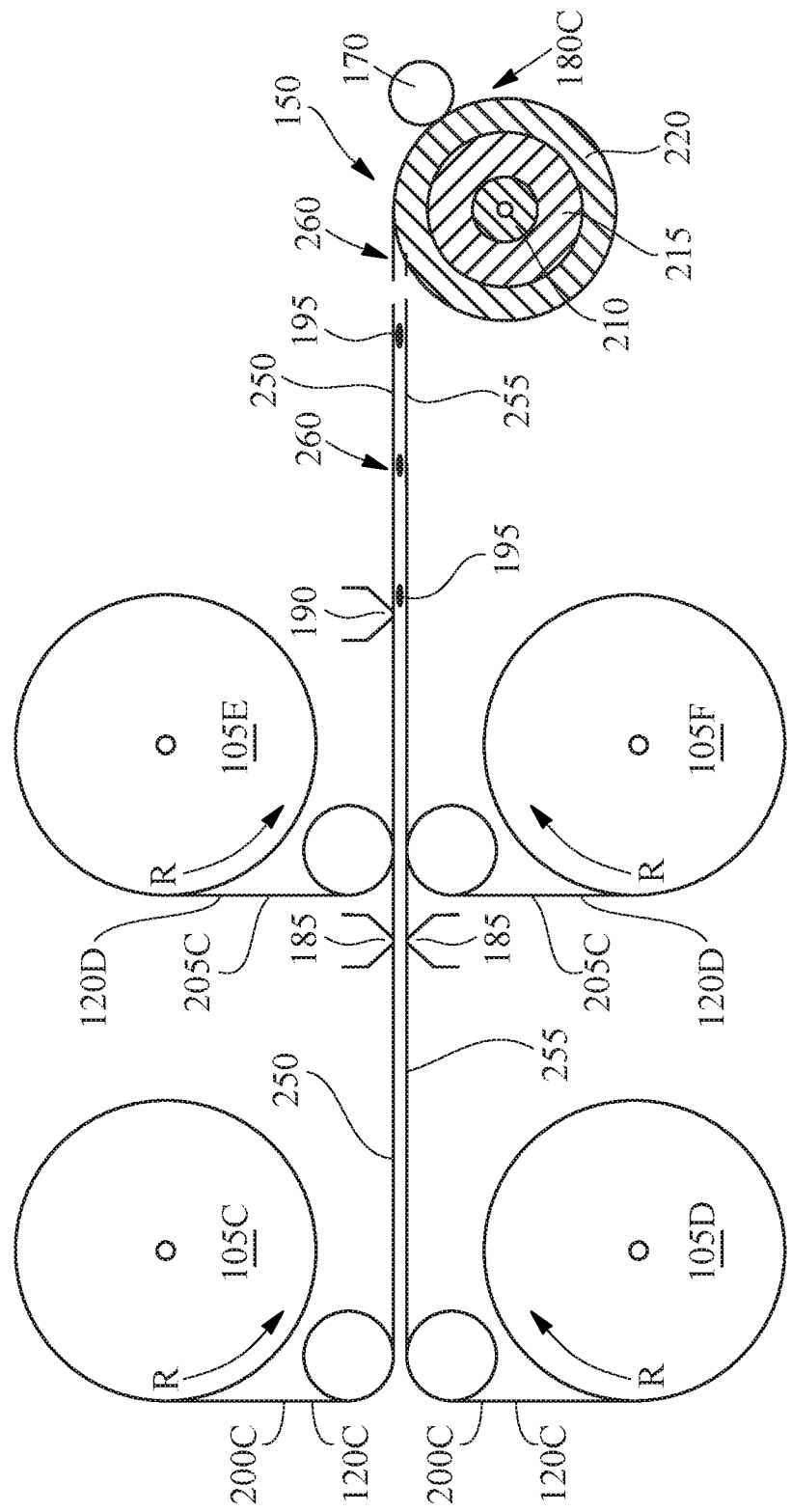
FIG. 7 is a side elevational view of yet another process for the manufacture of a tubular structure.

Referring to FIG. 7, the second ply 255 of the first sheet metal 120C is then cut off with cut-off device 185 and a second ply 255 of the second sheet metal 120D comprising a second metal material 205C is then unwound from a fourth supply coil 105F and fed into the bonding process 190 where it is bonded to the first ply 250 of the second sheet metal 120D to form a two-ply sheet metal laminate 260. The two-ply sheet metal laminate 260 is then fed into the recoiler 150 where the two-ply sheet metal laminate 260 is wound into the third region 220 of the tubular structure 180C. As would be recognized by one of skill in the art, this can provide the capability to produce a multi-metallic tubular structure 180C utilizing a more efficient sheet splicing operation upstream of the bonding process. It should also be recognized by one of skill in the art that the formed multi-metallic tubular structure 180C can have discrete regions (i.e., first inner 210, second 215, and third 220 regions) where both plies of the two-ply sheet metal laminate 260 forming each discrete region comprise the same sheet metal 120 material. Thus, the instance where each ply of the two-ply sheet metal laminate 260 are formed from different sheet metal materials 120 constitutes only a transition between adjacent, same sheet metal 120 material two-ply sheet metal laminate 260 regions.

Referring again to FIGS. 3 and 4, a tubular structure 180B can be produced by convolutely winding at least one sheet metal and at least one sheet of a material other than metal to form a resulting tubular structure 180B. A first sheet metal 120A supplied in a first sheet metal supply coil 105A is unwound, processed, and rewound into a first inner region 210 of tubular structure 180B. A second sheet comprising a material other than metal 225 is supplied in a second coil 105G, unwound, processed, and rewound into a second region 215 of tubular structure 180B. By way of non-limiting example, a material other than metal 225 could comprise paperboards, cardboards, polymer sheets, fabrics, composites, elastomers, leathers, foams, and the like. The first sheet metal 120A supplied from the first sheet metal supply coil 105A is then unwound, processed, and rewound into a third region 220 of the desired tubular structure 180B. In this embodiment, the resulting convolutely wound tubular structure 180B comprises at least two materials—a first metal used to form first inner 210 and third 220 regions of tubular structure 180B and a second sheet comprising a material other than metal 225 used to form the second region 215 of tubular structure 180B. This bi-material form of the tubular structure 180B can offer significant advantages as the first and second materials may be independently selected for optimum cost and performance which are best suited for the requirements of the specific region (i.e. inner, middle, or outer) of the tubular structure 180B. For example, stainless steel may be used to provide corrosion resistance for both the first inner region 210 (i.e., interior) and third region 220 (i.e., exterior regions) of a pipe wall while low cost paperboard can be used to form the second region 215 of the pipe wall to provide a desired performance at lower cost. It may be preferable to bond at least a portion of adjacent layers within the first inner 210, second 215, and third 220 regions of tubular structure 180B. For example, the layers can be bonded with adhesive or with laser welding.

Coaxial Void Creation

Tubular structures having improved strength-to-weight properties may be desired and/or required. Here, at least a portion of the convolutely wound tubular structure may be formed with a net structural density that is substantially less than the density of the constituent sheet metal material used to form the tubular structure. The reduced density portion of the tubular structure wall may be designed to optimize any desired mechanical property or combination of mechanical properties of the tubular structure. This includes, but is not limited to, mass, weight, shear strength, axial tensile strength, axial compression strength, torsional strength, modulus of elasticity in a desired plane or orientation, internal pressure rating, and external pressure rating.

Figure 8:
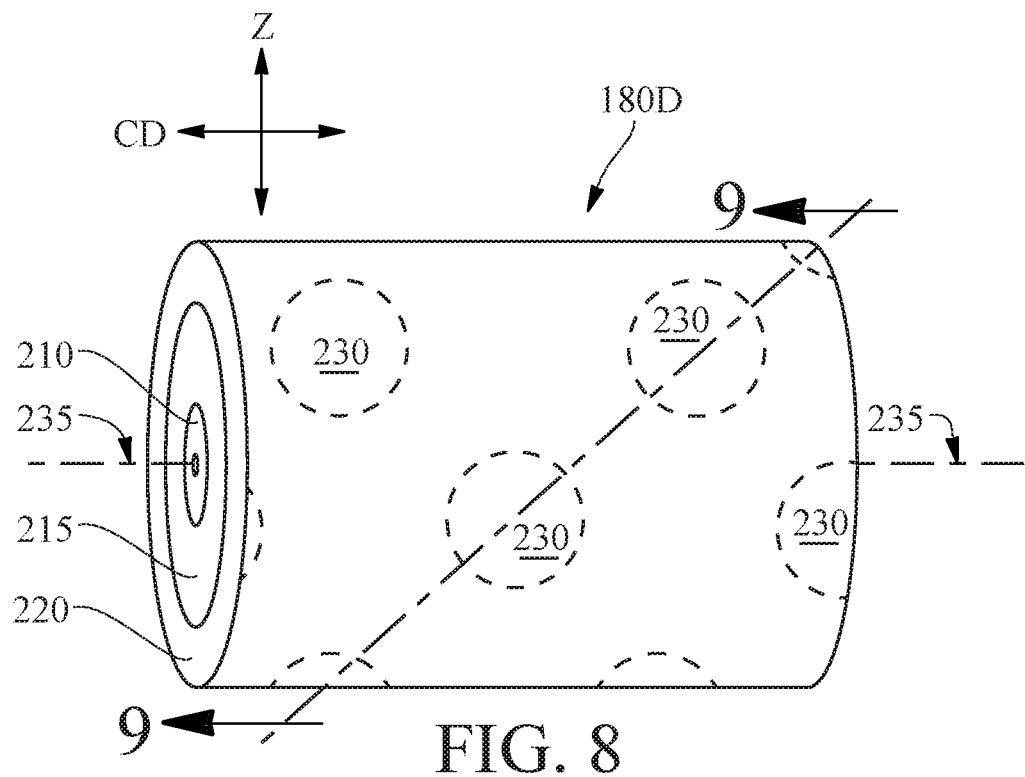
FIG. 8 is an elevational view of yet another convolutely wound tubular structure.
Figure 9:
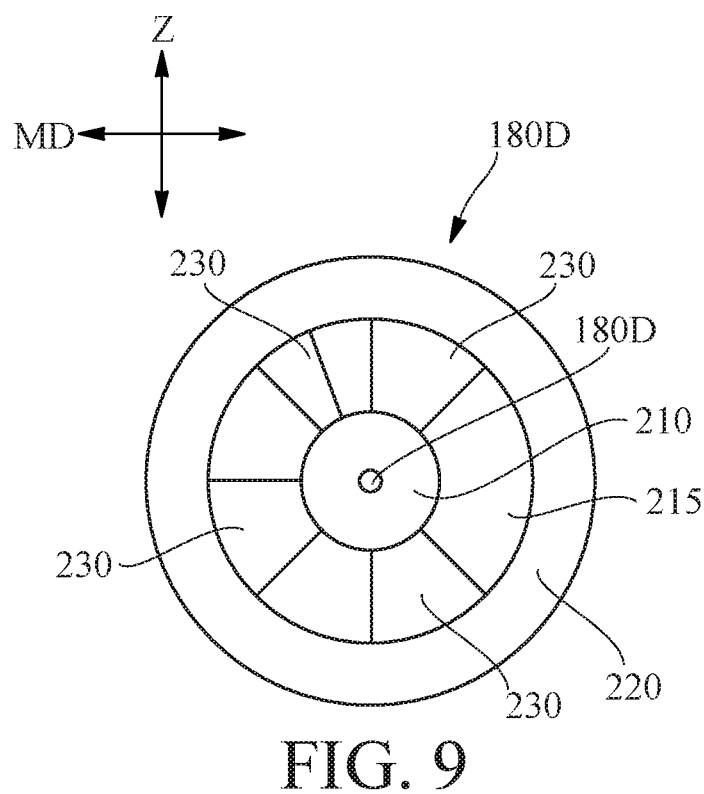
FIG. 9 is a cross-sectional view of the convolutely wound tubular structure of FIG. 8 taken along line 9-9.

FIGS. 8 and 9 provide an exemplary tubular structure 180D with improved strength-to-weight properties. The tubular structure 180D may be produced by convolutely winding a sheet metal comprising pre-formed voids 230 to form at least a portion of the tubular structure 180D. For example, a first inner region 210 of the tubular structure 180 can be formed by convolutely winding a homogenous sheet metal around the longitudinal axis 235 of the tubular structure 180. A second region 215 of the tubular structure 180D is then formed by winding a second sheet metal having pre-formed voids 230, such as circles, around the first inner region 210 about the longitudinal axis 235 of the tubular structure 180D by overlying the first sheet metal. A perforated sheet metal having a total void area of 30% to 80% can be used to form at least a portion of the second region 215 of the tubular structure 180D. A third region 220 of the tubular structure 180D is then formed by winding the first homogenous sheet metal around second region 215 about the longitudinal axis 235 of the tubular structure 180D and overlying the second sheet metal until the desired wall thickness and the desired outer dimensions of the tubular structure 180D are attained. The tubular structure 180D formed in this manner can have a surprisingly substantially lower total mass with a relatively minor decrease in strength, modulus of elasticity, and pressure rating. This type of improved strength-to-weight tubular structure 180D may be especially useful in aeronautical, space, and inter-stellar applications.

Figure 10:
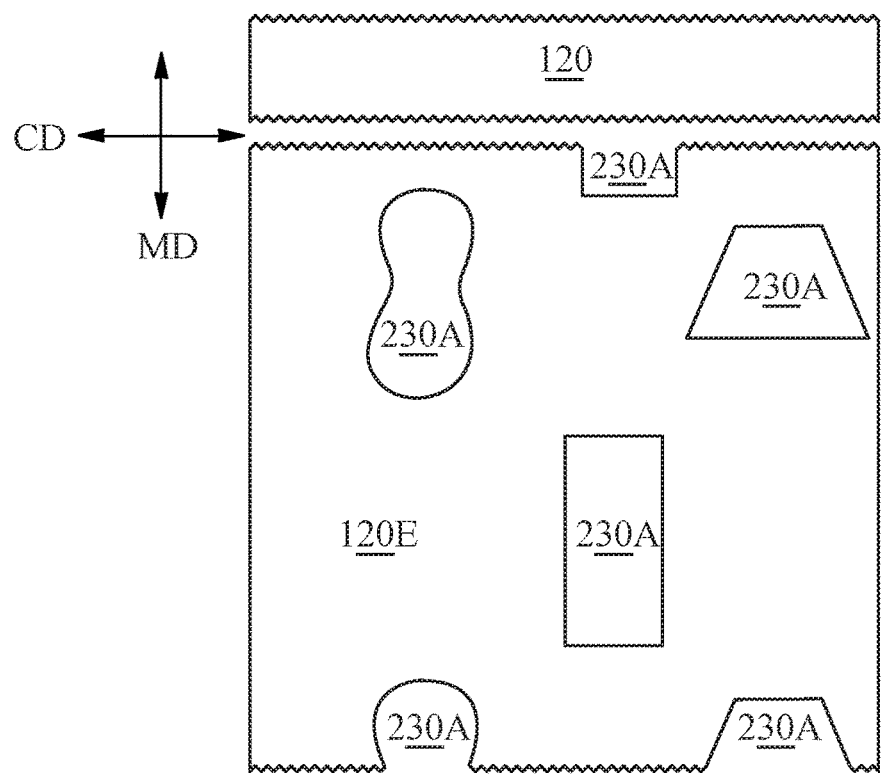
FIG. 10 is a plan view of an exemplary sheet metal.
Figure 11:
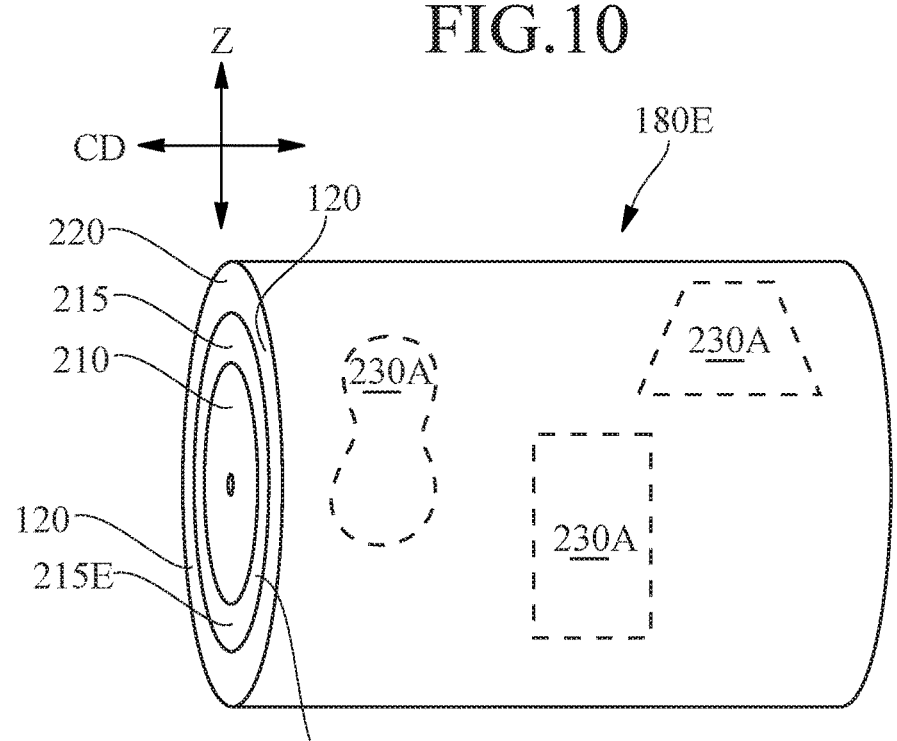
FIG. 11 is an elevational view of a convolutely wound tubular structure manufactured from the sheet metal of FIG. 10.

As shown in FIGS. 10 and 11, a tubular structure 180E with improved strength-to-weight properties may be produced by unwinding a homogenous sheet metal 120, forming voids in situ in selected portions of the sheet metal 120 with a void generation system to form a sheet metal 120E portion having voids disposed therein, and then winding the sheet metal 120E into tubular structure 180E. In a non-limiting example, the voids 230A can be registered in the cross-machine direction but unregistered in the machine direction. A first sheet metal 120 supplied in a first sheet metal supply coil 105 is unwound in an uncoiler apparatus 110 and fed into a downstream recoiler 150 where it is convolutely wound to form the first inner region 210 of the tubular structure 180E. After the first inner region 210 of the tubular structure 180E is formed, voids 230A are generated in the sheet metal 120 to form a sheet metal 120E having voids disposed therein prior to winding the sheet metal 120E to form the second region 215 of tubular structure 180E.

Voids 230A can be generated to form sheet metal 120E portion by mechanical contact operations such as punching or cutting. The punching or cutting operations may remove discrete portions of sheet metal 120E to reduce mass while still maintaining substantial material continuity in both the machine- and cross-machine directions. Alternatively, voids 230A can be generated to form sheet metal 120E by nonmechanical cutting operations such as water jet cutting or laser cutting. Water jet and laser cutting systems are known in the art and can be effective in cutting sheet metal. Both water jet and laser cutting systems also have advantages for quickly and easily changing the void size, shape, or spacing. Since no mechanical tooling is used in these systems, they are more flexible and can quickly make changes via programming to control the position of the device that cuts the sheet metal. Other metal cutting techniques known in the art may also be used to generate voids 230A. The position, size, shape, and spacing of the discrete voids 230A can be selected to provide a reduced mass and preservation of mechanical properties such as strength, modulus of elasticity, and pressure rating. After the second region 215 of the tubular structure is formed with the sheet metal 120E, the void generation system can be de-activated. The homogenous first sheet metal 120 can then be wound to form the third region 220 of the tubular structure 180E. It may be preferable to bond at least a portion of the adjacent layers within the inner 210, second 215, and outer 220 regions of the tubular structure 180E as discussed supra. The tubular structure 180E can have substantially lower total mass with a relatively minor decrease in strength, modulus of elasticity, and pressure rating. This type of improved strength-to-weight tubular structure 180E may be especially useful in aeronautical and space applications.

Figure 12:
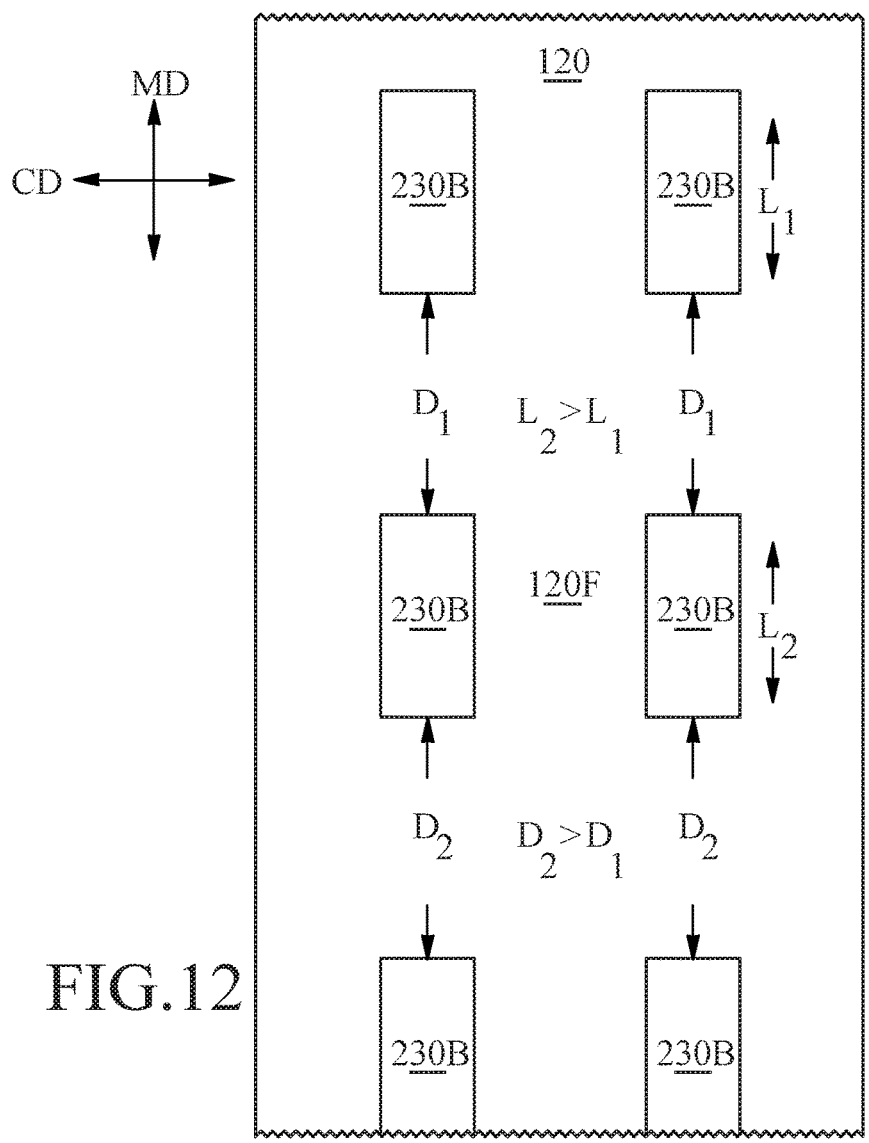
FIG. 12 is a plan view of another exemplary sheet metal.
Figure 13:
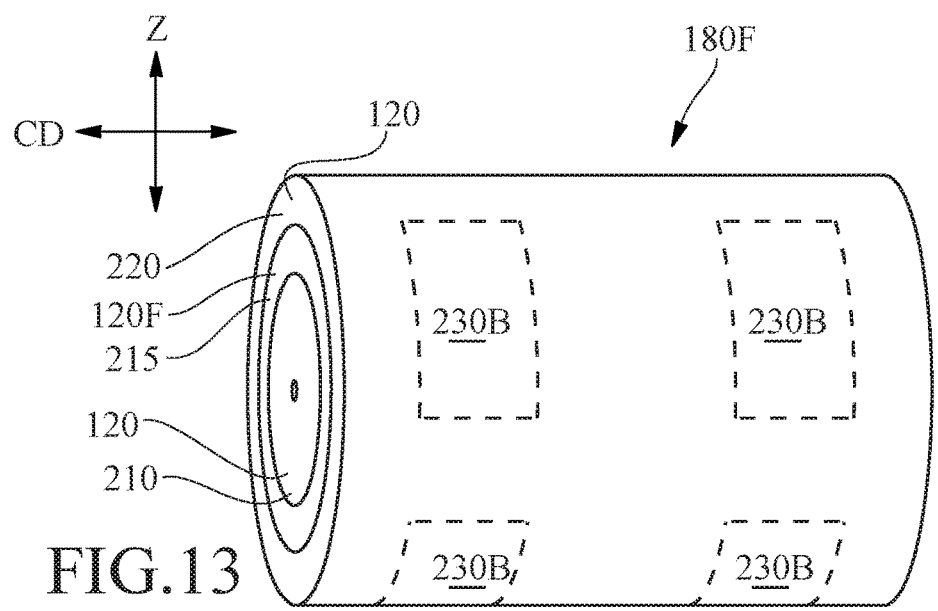
FIG. 13 is an elevational view of a convolutely wound tubular structure manufactured from the sheet metal of FIG. 12.

Alternatively, as shown in FIGS. 12-13, a tubular structure 180F with improved strength-to-weight properties may be produced by unwinding a homogenous sheet metal 120, forming voids 230B in the sheet metal 120 to form a sheet metal 120F, and winding the first sheet metal 120F into a tubular structure 180F as discussed supra. The voids 230B can be registered in both the cross-machine direction and the machine direction. A laser cutting system may be controlled to create any desired void 230B position, size, and shape. The machine direction void 230B spacing and cross machine void spacing may also be controlled. Voids 230B can be generated in the sheet metal 120 to form relatively high aspect ratio rectangles with their minimum dimension generally parallel to the longitudinal axis 235 of the tubular structure 180F. The machine direction spacing $D_1$, $D_2$ of the voids 230B can be increased for succeeding voids 230B so that a void 230B overlays a preceding void 230B when wound into the tubular structure 180F. The machine direction void spacing increase (i.e., $D_2 > D_1$) can be proportional to the thickness of the first metal material 200 forming sheet metal 120 and may be pre-determined and programmed into the laser cutting system by means known in the art. The machine direction length $L_1$, $L_2$ of the voids 230B can be increased for succeeding voids 230B so that a void 230B overlays a preceding void 230B when wound into the tubular structure 180F. Additionally, the machine direction void length increase (i.e., $L_2 > L_1$) can be proportional to the thickness of the first metal material 200 forming sheet metal 120 and may be pre-determined and programmed into the laser cutting system by means known in the art. Further, voids 230B can be axially aligned and circumferentially aligned, thus creating continuous structural regions in the axial direction which provide a tubular structure 180F with a relatively high cross-sectional moment of inertia and correspondingly low axial deflection.

After the second region 215 of tubular structure 180F is formed with sheet metal 120F comprising the desired voids, the void generation system is de-activated and the remainder of tubular structure 180 formed with the homogenous sheet metal 120 as discussed supra. The tubular structure 180F formed in this manner has substantially lower total mass with a relatively minor decrease in strength, modulus of elasticity, and pressure rating. This type of improved strength-to-weight tubular structure 180F may be especially useful in aeronautical and space applications.

Z-Direction Out-of-Plane Deformation of the Sheet Metal

Referring to FIGS. 18-23, an alternative manufacturing process 100G for improved strength-to-weight tubular structures 180G uses out-of-plane deformation of the sheet metal 120 which is subsequently wound to form the tubular structure 180G. An out-of-plane deformed sheet metal 120 (e.g., a 'fluted' sheet metal 120) can create void volumes 285 between subsequent layers of sheet metal 120 within the convolutely wound tubular structure 180. These void volumes 285 can reduce mass without significant degradation of physical properties such as strength, modulus of elasticity, and pressure rating. In a preferred embodiment, the out-of-plane, or z-direction, deformation is attained by passing the sheet metal 120 through a nip 290 formed by engaging a first pattern roll 295 with a second pattern roll 300. The entire width of the sheet metal 120 is subject to the deformation process.

The first 295 and second 300 pattern rolls have corresponding 3D patterns of protrusions 305 and recessions 310 engraved on the peripheral surfaces thereof. The pattern rolls 295, 300 are inter-engaged with each other to provide preferably a multiplicity of individual engaging configurations formed by the individual corresponding protrusions 305 and recessions 310 of the pattern rolls 295, 300 during the rotation thereof, wherein preferably each protrusion 305 of the engraved embossing pattern of one of the rolls 295, 300 at some portion of rotation becomes inter-engaged with a corresponding recession 310 of the opposite roll 300, 295 such as to form preferably a substantially non-contacting relationship between the inter-engaged corresponding protrusion 305 and recession 310. The non-contacting relationship includes a full engagement position, when the corresponding individual protrusion 305 and recession 310 of the inter-engaged pattern rolls 295, 300 become aligned with each other and with the opposing axes of rotation of the pattern rolls 295, 300 respectively. The full engagement position includes desired clearance(s), enough to accommodate the desired thickness of the sheet metal 120 to be deformed between the inter-engaged protrusions 305 and recessions 310 of the rotating pattern rolls 295, 300. The first pattern roll 295 has a first deformation pattern engraved on the peripheral surface thereof, comprising protrusions 305 and recessions 310. The second pattern roll 300 has a second deformation pattern engraved on the peripheral surface thereof, comprising recessions 310 and protrusions 305. The protrusions 305 of the first pattern roll 295 engage with the corresponding recessions 310 of the second pattern roll 300, and similarly, the recessions 310 of the first pattern roll 295 engage with the corresponding protrusions 305 of the second pattern roll 300.

Corresponding protrusions 305 and recessions 310 become inter-engaged with each other to form the full engagement position and a resulting deformation of the sheet metal 120 in accordance with the present invention are preferably inter-engaged such that they are separated from each other by desired clearance(s) therebetween, such as sidewall clearances and radial clearances. For instance, a sidewall clearance can be formed between the sidewalls of the corresponding inter-engaged protrusions 305 and recessions 310. Further, a first radial clearance can be formed between the top surface of the protrusions 305 of the first pattern roll 295, defining an outermost peripheral surface of the first roll 295, and the bottom surface of the corresponding recessions 310 of the second pattern roll 300, defining an innermost peripheral surface of the second pattern roll 300. Similarly, a second radial clearance can be formed between the bottom surface of the recessions 310 of the first pattern roll 295, defining the innermost peripheral surface of the first pattern roll 295, and the top surface of the corresponding protrusions 305 of the second pattern roll 300, defining the outermost peripheral surface of the second pattern roll 300.

Any desired pattern may be engraved on the first pattern roll 295, with a correspondingly complementary pattern engraved on the second pattern roll 300. In a preferred embodiment, the patterns are selected to provide the desired out-of-plane deformation. The selected patterns may optimize the z-direction deformation distance, the size and shape of individual deformations, the spacing of deformations from one another, and the total deformation area and the resulting void volume 285 area created in second region 215. Deformations may be made out-of-plane in one direction from the central plane of the sheet metal 120 or in both directions. The deformation size and spacing may be controlled to allow nesting of a first deformation with an overlying second deformation in the rewound tubular structure 180G, wherein the radial distance between the centroid plane of adjacent layers of sheet metal in a nested region is less than the radial distance between the centroid plane of adjacent layers of sheet metal in a non-nested region. The deformation size and spacing may also be selected to prevent nesting.

Engagement between the first pattern roll 295 and the second pattern roll 300 may be controlled by adjusting the relative position of the first pattern roll 295 bearing housings to the second pattern roll 300 bearing housings. In a non-limiting example, the first pattern roll 295 bearings are fixed to a frame. The second pattern roll 300 is mounted to a pivot in the frame. The longitudinal axis of the second pattern roll 300 is parallel to the longitudinal axis of the first pattern roll 295 and offset such that the outer surface of the first pattern roll 295 is separated by a relatively short distance from the outer surface of the second pattern roll 300. Linear actuators known in the art can be connected to each of the two second pattern roll 300 bearing housings and move the second pattern roll 300 about a pivot point to engage the second pattern roll 300 with the first pattern roll 295 until the desired depth of engagement is attained. The linear actuators can be independently controlled to ensure consistent depth of engagement at both ends of the pattern rolls 295, 300. Linear actuators can engage the pattern rolls 295, 300, to maintain the depth of engagement as the rolls 295, 300 rotate, and disengage the pattern rolls 295, 300 at any desired time.

In a preferred embodiment, the second pattern roll 300 is engaged with the first pattern roll 295 so that the complementary patterns engage symmetrically. Lateral gaps between mating elements can be equal on both sides, as well as machine direction gaps. In a non-limiting example, adjustment screws may be used to reposition the bearing housings in a cross-machine direction relative to the frame and the first pattern roll 295 to equalize the lateral gaps between mating elements. A drive motor may be coupled to the first pattern roll 295. A first gear mounted to the first pattern roll 295 may engage and drive a second gear mounted to the second pattern roll 300 to maintain circumferential registration throughout the deformation process. Adjustment screws and circumferential slots in the second gear may be used to make circumferential adjustments and equalize machine direction gaps between mating elements.

By way of example, sheet metal 120 is unwound from a supply coil 105 and fed into the sheet metal deformation unit 315 operation. Initially, the pattern rolls 295, 300 are disengaged, and no deformation occurs. The sheet metal 120 passes between the disengaged pattern rolls 295, 300 and is fed into the recoiler 150 where it is convolutely wound to form the first inner region 210 of tubular structure 180G. The second pattern roll 300 is then engaged with the first pattern roll 295 until the desired depth of engagement is attained. The sheet metal 120 continues passing between the pattern rolls 295, 300, is deformed out-of-plane in the Z-direction and is subsequently wound into the second region 215 of tubular structure 180G. The pattern rolls 295, 300 can remain engaged long enough to deform a machine direction length of sheet metal 120 approximately equal to the perimeter of tubular structure 180G. The pattern rolls 295, 300 are then disengaged and remain disengaged until a machine direction length of sheet metal 120 has passed between the rolls 295, 300 corresponding to the new perimeter of the tubular structure 120. This process is repeated until the second region 215 of the tubular structure 180G has been completely formed. The resulting alternating layers of flat/deformed/flat sheet metal 120 can provide a strong structure while preventing nesting of overlying peaks and valleys in the deformed sheet metal 120 and maximizing the efficiency of the void volumes 285 to reduce the density of tubular structure 180G. After the second region 215 of tubular structure 180G is formed, the pattern rolls 295, 300 remain disengaged while undeformed sheet metal 120 passes between the pattern rolls 295, 300 and is subsequently wound into the third region 220 of tubular structure 180G until the desired wall thickness and outer dimensions are attained. The tubular structure 180G formed in this manner can have substantially lower total mass with a relatively minor decrease in strength, modulus of elasticity, and pressure rating. This type of improved strength-to-weight tubular structure 180G may also be useful in aeronautical and space applications. Couplings can be used on both ends of the tubular structures 180G to totally enclose the exposed void regions 285.

In certain applications, it may be advantageous to provide out-of-plane deformations to multiple (e.g., several) layers of sheet metal 120 simultaneously prior to winding. An additional exemplary embodiment could provide an undeformed sheet metal 120 layer disposed between successive layers of out-of-plane deformed layer to prevent 'nesting' of successive deformations or protrusions in succeeding layers of the wound tubular structure 180. In a preferred embodiment, successive layers of out-of-plane deformed layers are not bonded to each other but rather to an intermediate layer of un-deformed sheet metal 120 disposed therebetween.

Sheet Surface Modifications

In some applications, it may be desired to use tubular structures 180 having enhanced surface properties on the interior and/or exterior of the tubular structure 180. For example, a food processing operation may require a smooth pipe interior that is resistant to buildup and microbial contamination. In prior art pipe fabrication processes, such as the production of seamless pipe, this is difficult to achieve. The original formed surface is, by nature, rough. Secondary smoothing processes may mitigate the roughness. But these are expensive, time consuming, and limited in effectiveness. A layered fabrication process, combined with the low temperature processing capability, can provide the desired pipe interior comprising enhanced surface properties For example, 316 grade cold rolled stainless steel is supplied in sheet metal form. The sheet metal may be produced with an ASTM No. 8 finish that is exceptionally smooth and mirror-like in its appearance. This mirror-like surface may be used to form the first inner region of the desired tubular structure. A standard 316 stainless steel with a relatively rougher ASTM No. 2B finish may be used to form the succeeding second region and third region of the pipe. This fabrication process provides the desired enhanced surface for the pipe's interior while maintaining the use of standard, cost effective materials for the overwhelming majority of the pipe's total material. The pipe's exceptionally smooth interior surface may effectively mitigate buildup and contamination as particles cannot easily stick to it. Cleaning and flushing operations can also easily remove any small areas of buildup that may occur.

In another non-limiting example, a low surface energy coating, microbial resistant coating, or anti-microbial coating may be applied to the 316 grade stainless steel sheet metal with an ASTM No. 8 finish prior to winding the sheet metal into the first inner region of the pipe. This selective coating may further enhance the surface properties of the pipe's interior and further mitigate buildup, contamination, and microbial growth. Any combination of coatings and finishing operations may be used to selectively improve the sheet metal 120 surface which subsequently forms the interior surface of a wound tubular structure 180.

Similar techniques may be used to provide enhanced surface properties for the exterior surface of the tubular structure 180. These improvements may mitigate environmental damage by providing corrosion resistance, mitigating algae growth in subsea applications, and the like. Any combination of coatings and finishing operations may be used to selectively improve the exterior surface of a wound tubular structure 180.

Adhesive Bonding of Layers

It may be necessary to constrain the respective layers from unwinding or unraveling during transportation and end usage in some layered tubular structure 180 applications. In one embodiment, the layers can be adhesively bonded 190 during the manufacturing process using a class of adhesives known as structural adhesives. These adhesives are typically based on epoxy, acrylic, urethane, or cyanoacrylate chemistries and are known in the art to provide very strong bonds between adjoining metal surfaces.

In a preferred embodiment, adhesive is applied to one side of the sheet metal 120 after other processes such as splicing, void generation, and out-of-plane deformation are complete, and before the winding process. Adhesive application processes known in the art are suitable for applying the liquid adhesive in this application. These fluid application processes include spray, extrusion through nozzles, extrusion through slot dies, gravure, offset gravure, flexographic, permeable rolls, jetting, and spray systems. In one non-limiting example, a permeable roll is used to apply adhesive to sheet metal 120 just prior to sheet metal 120 being wound to form tubular structure 180. Adhesive is applied in a desired pattern (defined by the aperture pattern in the surface of the permeable roll) to the top face of sheet metal 120 as sheet metal 120 travels in a near-horizontal plane just prior to entering recoiler 150 and the winding process. The application pattern may be optimized for the particular tubular structure 180 application. For example, adhesive can be applied in a continuous line at the transverse leading edge of the sheet metal 120, continuous lines along both edges of the sheet metal 120, and in discrete dots spaced apart in regular intervals in both the machine direction and cross machine direction.

As sheet metal 120 enters the recoiler 150, it is attached to winding mandrel 160 via vacuum ports in the surface of mandrel 160. The bottom face of sheet metal 120, without adhesive, is brought into contact with the surface of mandrel 160. As mandrel 160 rotates, sheet metal 120 is guided around the longitudinal axis of mandrel 160 to form first layer 210 of tubular structure 180. After approximately one revolution, the leading edge 175 of the top face of sheet metal 120 is brought into contact with the bottom face of sheet metal 120 entering the winding process and layer-to-layer bonding occurs. Continued rotation of mandrel 160 conveys additional sheet metal 120 into the winding process 100, with adhesive previously applied in a pattern on the top face continuing to contact and bond with the bottom face of the sheet metal 120 entering the winding process. This process continues until the tubular structure 180 wall thickness and desired outer dimensions are attained. In a preferred embodiment, adhesive application is discontinued for the last length of sheet metal 120 corresponding to the final perimeter of tubular structure 180. This ensures no adhesive is present on the exterior of the tubular structure 180. In another embodiment, a supplemental line of adhesive can be applied at the transverse trailing edge of sheet metal 120 to effectively seal the exterior edge layer.

Once adhesive has been applied to at least one face of sheet metal 120 entering the winding process, the winding tension and the force exerted by an adjustable pressure roll 170, which presses in a generally perpendicular direction to sheet metal 120 to compress sheet metal 120 against the winding tubular structure 180, provide sufficient pressure to effectively bond the layers of tubular structure 180 together during the winding process. Some adhesives can require curing at elevated temperatures. If these adhesives are selected, the finished tubular structure 180 may be placed inside an oven known to provide the required curing environment. Some adhesives also require two parts, with one fluid acting as a catalyst to activate the bonding in the other fluid. If these adhesives are used, a secondary permeable roll may be used to apply the second adhesive to the bottom face of sheet metal 120 prior to the winding process. The bottom face adhesive pattern may match the top face adhesive pattern and be registered in both the machine direction and cross machine direction by means known in the art to ensure the two adhesives are brought into face to face contact in the winding process.

The continuous lines of adhesive at the transverse leading edge 175, transverse trailing edge, and both sides of sheet metal 120 ensure uninterrupted sealing at all edges of tubular structure 180. This can ensure no inter-layer migration of the interior fluid or gas conveyed within tubular structure 180 and can prevent exterior inter-layer migration of environmental liquids or gas.

In yet another embodiment, adhesive can be applied in a pattern to bond radially adjacent layers of sheet metal. The pattern may provide at least 30% or at least 40% or at least 50% unbonded area. The unbonded area preferably provides a radial gap between adjacent layers of sheet metal of at least 0.002 inch or at least 0.003 inch or at least 0.004 inch. The radial gap may be determined by controlling the type of adhesive, adhesive viscosity, the placement of discrete particles within the adhesive, the size of discrete particles disposed within the adhesive, the adhesive application rate per unit area, or any combination thereof. It has been surprisingly found that this bonding configuration can provide a desirable improvement in insulation capability in the wall of the resulting tubular structure due to the resulting air gap between radially adjacent layers of sheet metal. This improvement in insulation capability can reduce or eliminate the need for supplemental exterior or integrated insulation and provide significant cost savings. It has also been surprisingly found that this bonding configuration can provide a desirable improvement in dampening within the wall of the resulting tubular structure, thus minimizing propagation of vibration and noise through the pipe.

A suitable adhesive for use as discussed infra is Scotch-Weld™ Low Odor Acrylic Adhesive DP8810NS Green, manufactured by 3M™ Industrial Adhesives and Tapes Division 3M Center, Building 225-3S-06 St. Paul, Minn. 55144-1000. Such an adhesive is a 24-hour cure, two-part acrylic adhesive that provides the requisite shear, peel, and impact performance. This product provides appropriate adhesion to many plastics and metals, including those with slightly oily surfaces. This product has a suitable fast rate of strength build, providing structural strength in minutes, low odor and non-flammability. This adhesive further contains glass beads (0.010 inch diameter) to control bond line thickness. The adhesive has a tensile modulus about 140,000 psi, a tensile strength about 1,650 psi, a tensile strain at break about 6.5%, a viscosity about 40,000 cP, a density about 1.06 g/cm$^3$, and an overlap shear ranging from about 550 psi to about 3,600 psi (dependent upon material type and failure mode).

The adhesive bonding process 190 provides an effective means for creating a rigid structure from multiple layers of a relatively flexible sheet metal 120. The strength, modulus of elasticity, and pressure ratings of such tubular structures are theoretically equivalent to homogenous material structures comprising similar materials and dimensions.

Welding of Layers

Welding can be used to constrain the layers from unwinding or unraveling during transportation and end usage. In one embodiment, the layers are welded during the fabrication process using a fiber laser system.

The welding operation 195 can be applied to one side of sheet metal 120 after other processes such as splicing, void generation, and out-of-plane deformation are complete, and before or during the winding process. Many welding processes 195 are known in the art and several are suitable for permanently joining adjacent layers of sheet metal 120 in a wound tubular structure 180. These welding processes include shielded metal arc welding, gas metal arc welding, flux-cored arc welding, gas tungsten arc welding, submerged arc welding, electron beam welding, and laser welding. Several types of laser welding are known in the art and may be used, including gas lasers (which use a gas such as helium, nitrogen, or carbon dioxide as the medium), solid state lasers (which use solid media such as neodymium in yttrium aluminum garnet, or Nd:YAG), and fiber lasers (in which the medium is the optical cable itself). Fiber laser welding can be used to permanently attach adjacent layers of sheet metal 120 in a wound tubular structure 180. Fiber laser welding may permanently join as few as two adjacent layers or, if more power is applied, permanently join three or more adjacent layers of sheet metal 120. Fiber laser welding may be done in continuous lines or in discrete zones. The laser head may be positioned near the sheet metal to be welded and moved quickly and accurately in the x, y, and z planes by means known in the art to weld in any desired pattern. To improve operating rate and efficiency, multiple laser heads may be used to simultaneously weld multiple locations of sheet metal 120.

In a non-limiting example, three fiber lasers are mounted on the downstream side of the recoiler 150 and pointed in a generally horizontal plane toward the rewinding tubular structure 180. The first laser is mounted at a first machine direction edge of the winding sheet metal 120 and provides a continuous machine direction edge weld for a first end of the winding tubular structure 180. The second laser is mounted at a second opposite machine direction edge of the sheet metal 120 and provides a continuous machine direction edge weld for the second opposite end of the winding tubular structure 180. The third laser is movably mounted and provides continuous cross machine direction edge welds for the leading and trailing ends of the sheet metal 120 for each tubular structure 180. The third laser can also provide discrete spot welds across the face of the winding tubular structure 180. Discrete spot welds may be made in any desired position, any desired pattern, may have any desired spacing interval in the machine direction, and may have any desired spacing interval in the cross machine direction. A wound tubular structure 180 can be permanently welded together in a continuous area along both machine direction ends, both the leading and trailing transverse edges of the sheet metal 120, and at a sufficient number of interior locations to provide a rigid structure.

The welding process 195 can provide an effective means for creating a rigid structure from multiple layers of a relatively flexible sheet metal 120. The strength, modulus of elasticity, and pressure ratings of such tubular structures 180 are theoretically equivalent to homogenous tubular structures comprising similar materials and dimensions.

Creation of Enclosed Internal Pockets

Referring to FIG. 11, tubular structures 180E having enclosed internal pockets 230 can be provided with additional capabilities and benefits. In a first embodiment, homogenous sheet metal 120 is wound to form first inner region 210 of tubular structure 180E. Voids 230 are then generated in sheet metal 120 prior to winding sheet metal into a second region 215E of tubular structure 180E. Homogenous sheet metal 120 is then wound to form a third region 220 of tubular structure 180E. Voids 230 can be generated by any process as discussed supra. The position, size, shape, machine direction spacing, and cross machine spacing of the voids 230 may be selected to optimize the performance characteristic desired (e.g. the insulation, or noise reduction, or vibration reduction) and provide enough support for the overlying third region 220 of the tubular structure 180E. The number of layers comprising voids 230 may also be selected to optimize performance characteristics and provide enough support for third region 220 of tubular structure 180E. The cross-machine position of void 230 is controlled to maintain alignment of void 230 machine direction edges along longitudinal axis 235 of wound tubular structure 180E. The machine direction spacing of voids 230 and the machine direction length of voids 230 can be controlled to maintain circumferential alignment of cross-machine leading and trailing edges of voids 230 as successive layers of voids 230 are wound into tubular structure 180E. The first inner region 210 of homogenous sheet metal 120, the aligned circumferential void 230 edges, the aligned axially oriented leading and trailing void 230 edges, and the third region 230 of homogenous sheet metal 120 form internal enclosed pockets 230. The depth of internal enclosed pockets 230 may be controlled by generating voids 230 in the number of desired layers of sheet metal 120 within wound tubular structure 180E and by selecting the desired sheet metal 120 thickness for the sheet metal 120 forming second region 215E. The winding process is paused after the second region 215E of tubular structure 180E has been formed, material (e.g., insulation) is inserted into the enclosed internal pockets 230, and the third region 215 of the tubular structure 180E is subsequently wound to enclose the pockets 230 comprising insulation. A wide range of insulation materials are suitable for integration within wound tubular structures 180E. Non-limiting examples include mineral wool, rigid polyurethane foam, and silica or other aerogels.

Figure 22:
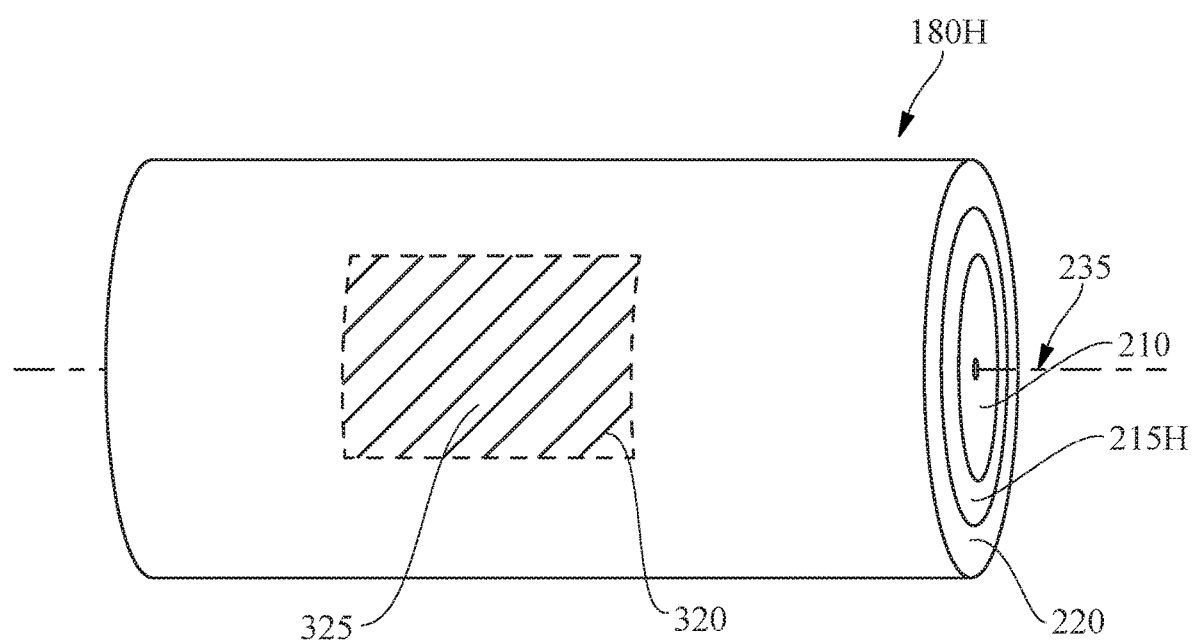
FIG. 22 is a perspective view of still another convolutely wound tubular structure.

Referring to FIG. 22, tubular structures 180H having enclosed internal pockets 320 can be filled with a material 325 (e.g., insulation, etc.) that can provide additional capabilities and benefits. For example, insulation may be required to maintain a desired temperature of fluid within a pipe. The insulation may be disposed within the tubular structure 180H to better control the temperature of the fluid conveyed through the pipe and may be totally enclosed to protect the insulation from the internal/external environment.

Two or more radial zones of insulation may be integrated within tubular structure 180H. A second zone of internal enclosed pockets 320 may overlie a first zone of internal enclosed pockets 320. The position, size, shape, cross machine spacing, machine direction spacing, and depth of internal enclosed pockets 320 in the first internal zone may differ from the position, size, shape, cross machine spacing, machine direction spacing, and depth of the internal enclosed pockets 320 in the second internal zone. The design of the enclosed internal pockets 320 of the wound tubular structure 180H and the insulation enclosed in pockets 320 may be selected to optimize the insulation capabilities of the tubular structure 180H for any selected application.

A vacuum can be generated and maintained within at least a portion of the enclosed internal pockets 320. Insulation effectiveness may be substantially improved by the vacuum level. In general, the greatest improvement in insulation effectiveness may be achieved by higher vacuum levels. In one embodiment, the vacuum within the enclosed internal pocket 320 can be maintained at a level less than 100 torr (133.32 millibars). In a more preferred embodiment, the vacuum within the enclosed internal pockets 320 can be maintained at a level less than 10 torr (13.33 millibars). A vacuum within a pocket 320 may be generated by means known in the art, such as inserting an access valve through the third region 220 of wound tubular structure 180H and into pocket 320. A pump may then be used to evacuate the air to a desired vacuum level. The access valve may have enough sealing capability to maintain the vacuum level for an extended period. The preservation of vacuum levels within pocket 320 may be enhanced by the application of a sealant to at least one face of sheet metal 120 comprising voids 230 prior to winding sheet metal 120 into tubular structure 180H. In a preferred embodiment, the sealant forms a continuous seal along the entire edge of each void 230 within sheet metal 120. A wound tubular structure 180H can comprise well sealed joints between adjacent layers of sheet metal 120 that form the pocket 320 surfaces.

Figure 23:
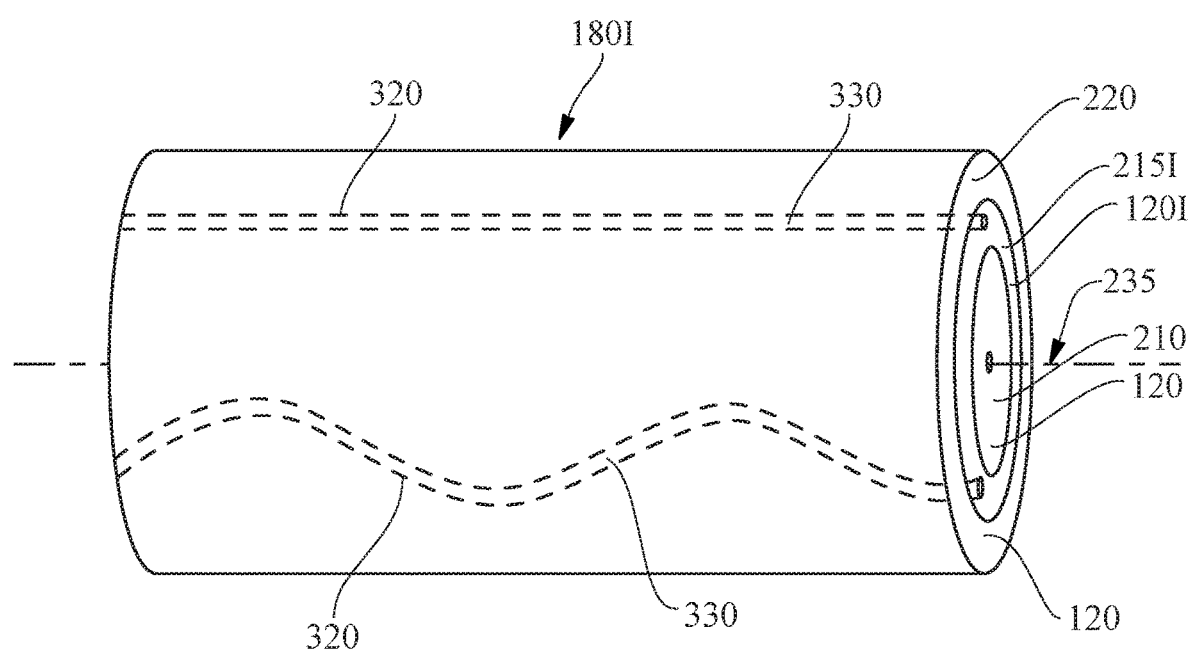
FIG. 23 is a perspective view of another convolutely wound tubular structure.

FIG. 23 provides a third embodiment where a pocket 320 can be formed within a wound tubular structure 180I wherein the pocket provides a continuous passageway 330 for a second gas or second fluid that may be used to transfer heat to, or from, the first gas or first fluid flowing through the interior of tubular structure 180I. In a preferred embodiment, the second gas or second fluid passageway 330 can be disposed coaxially between the interior of tubular structure 180I and the exterior surface of tubular structure 180I. The passageway 330 may be oriented to flow from a first end of tubular structure 180 to the opposite second end of tubular structure 180, and generally parallel to the longitudinal axis 235 of tubular structure 180I. The passageway 330 may also comprise a circumferential flow component wherein the flow is helical about the longitudinal axis of the tubular structure. The passageway 330 flow may comprise any desired combination of an axial flow component and a circumferential flow component. In a non-limiting example, the passageway 330 is formed by winding a first homogenous, full width, sheet metal 120 into a first inner region 210 of tubular structure 180I, wherein the length of tubular structure 180I is approximately equal to the width of sheet metal 120 used to form tubular structure 180I. Adjacent layers of first sheet metal 120 are welded together as they are wound into tubular structure 180I. First sheet metal 120 is then cut off in the cross machine direction and the winding process is paused. The leading edge 175 of a second sheet metal 120I comprising a relatively narrow width is then welded to the outer layer of first sheet metal 120 at a first end of tubular structure 180I. The supply coil of the second sheet metal 120I is disposed upstream of the recoiler 150 and is mounted such that the supply coil 105 cross-machine direction position may be continuously adjusted. Second sheet metal 120I is then wound to form a first layer of a second region 215I of tubular structure 180I while second sheet metal supply coil 105 is moved in the cross-machine direction from a first cross-machine direction position at one end of tubular structure 180I to a second cross-machine direction position at the opposite end of tubular structure 180I. The relatively narrow strip of second sheet metal 120I is welded to the underlying layer as it forms a helical strip overlying first inner region 210. The winding process is paused after the first helical layer of second region 215I has been formed. Second sheet metal 120I is cut off and the supply coil is moved back to the first cross machine position. The leading edge 175 of second sheet metal 120I is then welded to the first layer of second sheet metal 120I at the first cross-machine direction position. Second sheet metal 120I is then again wound to form a second layer of second region 215I of tubular structure 180I while the second sheet metal supply coil is moved in the cross-machine direction from the first cross-machine direction position at one end of tubular structure 180I to the second cross-machine direction position at the opposite end of tubular structure 180I. The relatively narrow strip of second sheet metal 120 is welded to the underlying layer as it forms a helical strip. The winding process is paused after the second helical layer of second region 215I has been formed. Second sheet metal 120I is cut off and the supply coil is moved back to the first cross-machine direction position. This winding process for second region 215I of tubular structure 180I can be repeated as many times as desired to form the desired number of layers within the second region 215I and a corresponding depth of the enclosed passageway. In one embodiment, all layers of sheet metal 120I within second region 215I are substantially aligned in the axial and circumferential directions such that each layer overlies the preceding layer, with corresponding edges in substantial alignment. The first, full width, sheet metal 120 is then wound to overlie the second region 215I and form third region 220 of tubular structure 180I. End plates with the appropriate shape and size can then be attached to both ends of tubular structure 180I to completely enclose the continuous passageway. The inlet for the second gas or second fluid at the first end of tubular structure 180I may be provided in the first end plate or through a portion of third region 220 of tubular structure 180I. The outlet for the second gas or second fluid at the second opposite end of tubular structure 180I may be provided in the second end plate or through a portion of third region 220 of tubular structure 180I at the second opposite end of tubular structure 180I. The second gas or second fluid may be connected via such inlets and outlets to adjacent sections of tubular structures 180I. Such embodiments comprising a second gas, or a second fluid, provide an improved means for transferring heat to or from the first gas or first fluid flowing through the interior of a tubular structure 180I.

Couplings

Prior art tubular structures require substantial secondary operations after the production of the tubular structures to add required ancillary components. The ancillary components include, but are not limited to, couplings for joining tubular structures in end-to-end configurations, flow sensors, pressure sensors, vibration sensors, and temperature sensors. The layered winding method 100 of the present disclosure provides the opportunity to integrate such components into the production of tubular structures 180, eliminating altogether the need for costly and less efficient secondary integration operations, or to minimize the secondary integration operations.

Figure 24:
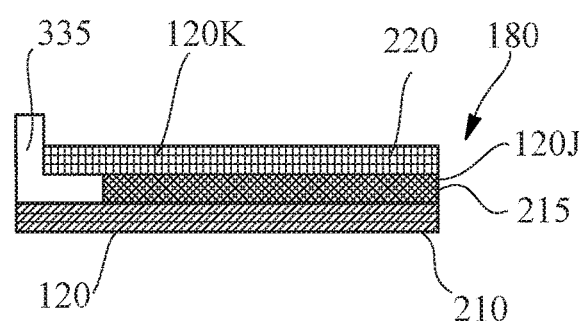
FIG. 24 is a cross-sectional view of a portion of a convolutely wound tubular structure showing a coupling matingly engaged therein.
Figure 25:
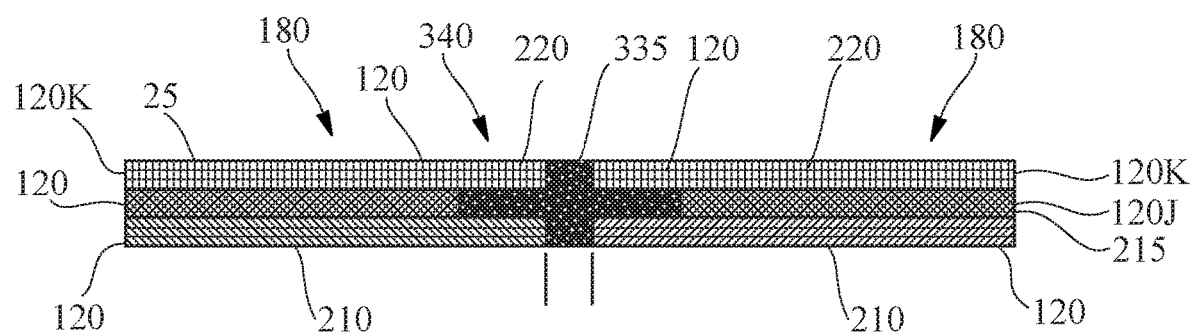
FIG. 25 is a cross-sectional view of a portion of two coupled convolutely wound tubular structures.

As shown in FIGS. 24-25, where one-half cross-section of the tubular structure 180 is shown, one embodiment provides for a coupling 335 to be integrated into the production of a tubular structure 180 to enable the mating engagement of tubular structures 180 in an end-to-end configuration to provide a desired length of connected tubular structures 340. The couplings 335 may comprise any form known in the art, including but not limited to flange, threaded, and right angle turns. The couplings 335 can comprise a flange configuration that enables subsequent connections using nuts and bolts. Flange couplings can be integrated into a wound pipe by winding a first sheet metal 120 comprising a first width to form a first inner region 210 of the pipe. In a preferred embodiment, adjacent layers of first sheet metal 120 are welded together during winding of first inner region 210.

The winding process 100 continues until the outside diameter of first inner region 210 of tubular structure 180 is slightly less than the inside diameter of an appropriately selected flange coupling 335. The winding process is paused, first sheet metal 120 is cut off in the cross-machine direction, and two flange couplings 335 are prepared for installation on opposed ends of tubular structure 180. In a non-limiting example, the inside surfaces and the outside surfaces of the coupling 335 hubs are coated with structural adhesive prior to integration into tubular structure 180. A first flange coupling 335 is then placed over a first end of tubular structure 180 and a second flange coupling 335 is placed over the opposed end of tubular structure 180. The outer end face of the first coupling 335 can be aligned in the cross-machine direction with the outer end face of first inner region 210 of tubular structure 180 and the outer end face of the second coupling 335 is aligned in the cross-machine direction with the outer end face of the tubular structure 180 first inner region 210. The first flange coupling 335 can be adhesively bonded to the first end of tubular structure 180 and the second flange coupling 335 is adhesively bonded to the second end of tubular structure 180.

In a non-limiting example, the flange couplings 335 comprise a hub, wherein the hub comprises an inner diameter that is approximately equal over the entire length of the hub. The hub also comprises an outside diameter that is approximately equal from the inner end face of the hub to the end of the hub that transitions to the integral flange portion of the coupling 335. The flange portion of the coupling 335 comprises a flange thickness and an outside diameter. In a preferred embodiment, the coupling 335 flange outside diameter is greater than the hub outside diameter and the hub outside diameter is greater than the hub inside diameter. After the two couplings 335 are placed on the opposite ends of the tubular structure 180, the first sheet metal 120 width is reduced to a second sheet metal 120J width by laser cutting or other suitable means, wherein the difference between the first sheet metal 120 width and the second sheet metal 120J width is approximately equal to the combined hub lengths of the first and second flange couplings 335. The leading edge of the second sheet metal 120J is then welded to the outer layer of the first inner region 210 of the tubular structure 180. Winding is then resumed to form the second region 215 of the tubular structure 180. In a preferred embodiment, the adjacent layers of the second sheet metal 120J are welded together during the winding of the second region 215 of the tubular structure 180.

In another preferred embodiment, both edges of second sheet metal 120J in each layer of second region 215 of tubular structure 180 are adjacent to the hub inner end faces of the first and second flange couplings 335. The winding process continues until the diameter of the second region 215 is approximately equal to the hub outside diameter of the two flange couplings 335. The winding process is then paused and second sheet metal 120J is cut off in the cross-machine direction. The sheet metal 120 width is then increased to a third sheet metal width 120K by laser cutting or other suitable means, wherein the difference between the first sheet metal 120 width and the third sheet metal 120K width is approximately equal to the combined thicknesses of the flange portions of the two couplings 335 installed on opposed ends of tubular structure 180. The leading edge 175 of sheet metal 120K is then welded to the outer layer of second region 215 of tubular structure 180. Winding is then resumed to form third region 220 of tubular structure 180. The first layer of the third region 220 overlies the outer surface of both the first and second flange coupling 335 hubs, which comprise adhesive previously applied, and the outer layer of second region 215. The third region 220 of the tubular structure 180 is thus adhesively bonded to the first flange coupling 335 and second flange coupling 335. In a preferred embodiment, adjacent layers of third sheet metal 120K can be welded together during the winding of third region 220 of tubular structure 180.

In another embodiment, both edges of third sheet metal 120K in each layer of third region 220 of tubular structure 180 are adjacent to the flange inner end faces of first and second flange couplings 335. The winding process continues until the diameter of third region 220 is approximately equal to the desired target tubular structure 180 outside diameter, at which point the winding process is terminated and third sheet metal 120K is cut off in the cross-machine direction.

The diameter of the flange bolt holes is sufficiently greater than the outside diameter of the tubular structure 180 to allow easy installation of nuts and bolts through the coupling 335 flanges to join adjacent tubular structures 180 and form a desired length of connected tubular structures 340. Other types of couplings 335 may be similarly integrated into wound tubular structures 180 or other tubular structures 180 by making manufacturing modifications as known by one of skill in the art. Other couplings 335 may provide connections for adjacent tubular structures 180 wherein the longitudinal axes 235 of the two tubular structures 180 are aligned. Alternatively, other couplings 335 may provide connections for adjacent tubular structures 180 wherein the longitudinal axis of a first tubular structure 180 is orthogonal to the longitudinal axis of a second connected tubular structure 180. This manufacturing method reduces or eliminates secondary fabrication processes related to the integration of couplings 335, such as separate welding operations, which are often effort intensive and costly.

Use of Common Couplings for Extended Lengths of Tubular Structures

Referring to FIG. 25, a desired length of connected tubular structures 340 may be produced by sequentially winding tubular structures 180 onto opposite ends of couplings 335, wherein the first end of a first coupling 335 is integrated into a first wound tubular structure 180 and the second end of the first coupling 335 is integrated into a second wound tubular structure 180. This method eliminates much of the effort required to connect tubular structures 180 after manufacturing is complete, such as the previous example of flange couplings 335 comprising nut and bolt fasteners.

In one embodiment, common couplings 335 can be integrated into the production of tubular structures 180 to enable joining the structures in an end-to-end configuration within the manufacturing environment. Common couplings 335 may comprise a center flange portion and hubs that extend outward from both sides of the center flange. Common couplings 335 comprise a center flange outer first diameter, a hub outer second diameter, a hub inner third diameter, and a center flange inner fourth diameter.

In a preferred embodiment, the center flange outer first diameter is greater than the hub outer second diameter, the hub outer diameter is greater than the hub inner third diameter, and the hub inner third diameter is greater than the center flange inside fourth diameter. For example, the center flange thickness of the center flange annular region disposed radially inside the hub portion of the coupling 335 is approximately equal to the center flange thickness of the center flange annular region disposed radially outside the hub portion of the coupling 335. To produce a first tubular structure 180, a first common coupling 335 may be integrated into a wound tubular structure 180 by winding a first sheet metal 120 comprising a first width to form a first inner region 210 of the first tubular structure 180. In a preferred embodiment, the adjacent layers of first sheet metal 120 are welded together during the winding of the first inner region of the first tubular structure 180. The winding process continues until the outside diameter of first inner region 210 of the first pipe is slightly less than the common coupling 335 hub inner third diameter. The winding process 100 is paused, first sheet metal 120 is cut off in the cross machine direction, and first common coupling 335 is prepared for installation on a first end of first tubular structure 180.

In a non-limiting example, the inside surfaces and the outside surfaces of a first end of the first common coupling 335 hub are coated with structural adhesive prior to integration into the first tubular structure 180. The first common coupling is then placed over a first end of the first tubular structure 180 where it becomes adhesively bonded to the first inner region of the first tubular structure 180. In a preferred embodiment, the innermost face of the center flange is positioned adjacent the end face of the wound first inner region 210 of the first tubular structure 180. After the common coupling 335 is placed on the first end of the first inner region 210 of the first tubular structure 180, first sheet metal 120 width is reduced to a second sheet metal 120J width by laser cutting or other suitable means, wherein the difference between the first sheet metal 120 width and the second sheet metal 120J width is approximately equal to the length of the first common coupling 335 hub portion that overlies first inner region 210 of wound first tubular structure 180. The leading edge of sheet metal 120J is then welded to the outer layer of first inner region 210 of first tubular structure 180. Winding is then resumed to form second region 215 of first tubular structure 180. In a preferred embodiment, adjacent layers of second sheet metal 120J are welded together during the winding of second region 215 of first tubular structure 180.

In another preferred embodiment, the edge of sheet metal 120J in each layer of second region 215 of first tubular structure 180 closest to common coupling 335 are adjacent to the common coupling 335 hub inner end face. The winding process 100 continues until the diameter of second region 215 is approximately equal to the hub outside second diameter. The winding process 100 is then paused and sheet metal 120J is cut off in the cross machine direction. The sheet metal 120J width is then increased to first sheet metal 120 width. The leading edge 175 of sheet metal 120 is then welded to the outer layer of second region 215 of tubular structure 180. Winding is then resumed to form third region 220 of tubular structure 180. The first layer of third region 220 overlies the outer surface of the common coupling 335 hub, which comprises adhesive previously applied, and the outer layer of second region 215. The third region 220 of tubular structure 180 is adhesively bonded to common coupling 335.

In another embodiment, adjacent layers of first sheet metal 120 are welded together during the winding of third region 220 of tubular structure 180. The edges of sheet metal 120 in each layer of third region 220 of tubular structure 180 closest to common coupling 335 are adjacent to the center flange's inner end face. The winding process continues until the diameter of outer third region 220 is approximately equal to the desired target first tubular structure 180 outside diameter, at which point the winding process 100 is terminated and sheet metal 120 is cut off in the cross machine direction. The outer diameter of the first tubular structure 180 third region 220 can be approximately equal to the center flange outer first diameter. This method provides means to integrate the first end of a common coupling 335 within a first wound tubular structure 180.

After the above common coupling 335 integration process is completed, the wound first tubular structure 180 may be removed from mandrel 160 and moved to a suitable cross machine position to not interfere with succeeding winding operations 100. In a preferred embodiment, first tubular structure 180 is supported by two rollers spaced apart underneath first tubular structure 180 and positioned to maintain alignment between the winding mandrel 160 longitudinal axis and the first tubular structure 180 longitudinal axis 235. In a preferred embodiment, the rollers are connected to a motor and may be driven at the same rotational speed as winding mandrel 160. A second tubular structure 180 is subsequently wound with first sheet metal 120 comprising the first width to form a first inner region 210 of the second pipe like the process to form the first tubular structure 180 described supra. When the first inner region 210 of the second tubular structure 180 section is slightly less than the common coupling 335 hub inner third diameter, the winding process is paused, and the first common coupling integrated within the first tubular structure 180 is prepared for installation on a first end of the second tubular structure 180. In a non-limiting example, the inside surfaces and the outside surfaces of the second end of the first common coupling 335 hub are coated with structural adhesive prior to integration into the second tubular structure 180. The first tubular structure 180, comprising the common coupling 335, is moved in the cross machine to place the second end of the common coupling 335 hub over the first end of the first inner region 210 of second tubular structure 180. The second end of the common coupling 335 hub becomes adhesively bonded to first inner region 210 of the second tubular structure 180.

In a preferred embodiment, the innermost face of the common coupling 335 center flange is positioned adjacent the end face of the wound first inner region 210 of the second tubular structure 180. After the common coupling 335 is placed on the first end of the first inner region 210 of the second tubular structure 180, the first sheet metal 120 width is reduced to a second sheet metal 120J and winding is then resumed to form second region 215 of the second tubular structure 180. The winding process 100 continues until the diameter of the second region 215 of the second tubular structure 180 is approximately equal to the hub outside second diameter. The winding process is then paused, sheet metal 120J width is then increased to the first sheet metal 120 width and welded to the outer layer of second region 215 of the second tubular structure 180. Winding is then resumed to form the third region 220 of the second tubular structure 180.

The winding process 100 continues until the diameter of the third region 220 of the second tubular structure 180 is approximately equal to the desired target second tubular structure 180 outside diameter, typically equal to the desired target first tubular structure 180 outside diameter. The winding process is stopped and sheet metal 120 is cut off in the cross machine direction.

This method provides means to integrate the second end of the common coupling 335 within a second tubular structure 180, thereby joining the first tubular structure 180, comprising the first end of the common coupling 335, to a second tubular structure 180, within the manufacturing environment. This method may be repeated as many times as desired to join two or more tubular structures 180 together within the manufacturing environment and produce a desired length of connected tubular structures 340.

Other types of couplings 335 may be similarly integrated into tubular structures 180 by making manufacturing modifications as known by one of skill in the art. This manufacturing method may reduce or eliminate secondary fabrication processes related to the integration of couplings 335, such as a separate welding operation, which are often effort intensive and costly.

2-Ply Offset Edge Configurations for Extended Tube Length Production

Figure 26:
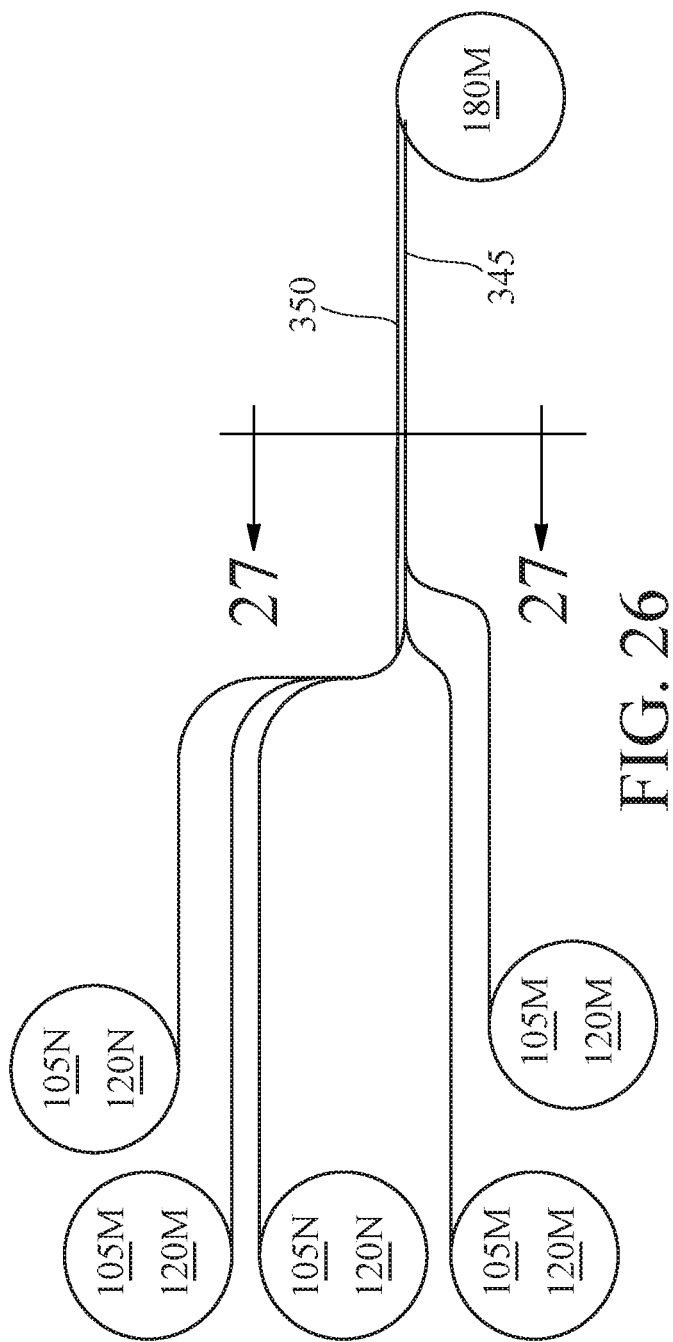
FIG. 26 is a side elevational view of still another process for the manufacture of a tubular structure; and, FIG. 27 is a cross sectional view of a two-layer sheet metal configuration useful for the manufacture of an extended length tubular structure and manufactured according to the process shown in FIG. 26.
Figure 27:
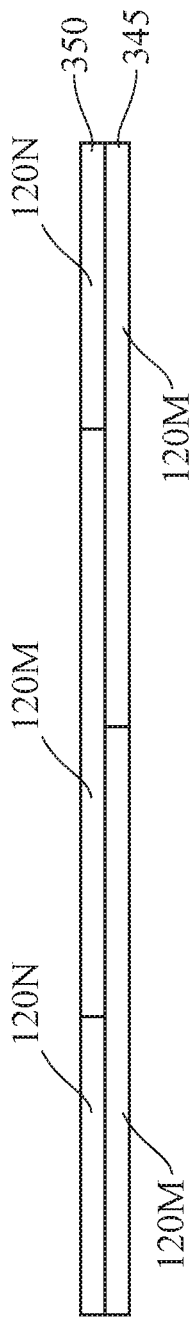

In the embodiment shown in FIGS. 26-27, an extended length tubular structure 180M may be produced by overlapping sheet metals in the cross machine direction prior to winding into tubular structures 180M. This method can eliminate the effort required to connect tubular structures 180M after manufacturing is complete, such as welding tubular structures 180M together in an end-to-end configuration.

For example, five supply coils of sheet metal 105M, 105N are provided to manufacture a tubular structure 180M, wherein all five supply coils 105M, 105N comprise the same material and grade of sheet metal. The first supply coil 105M comprises 304 grade stainless steel sheet metal 120M which is 72 inches wide, the second supply coil 105M comprises 304 grade stainless steel sheet metal 120M which is 72 inches wide, the third supply coil 105N comprises 304 grade stainless steel sheet metal 120N which is 36 inches wide, the fourth supply coil 105M comprises 304 grade stainless steel sheet metal 120M which is 72 inches wide, and the fifth supply coil 105N comprises 304 grade stainless steel sheet metal 120N which is 36 inches wide.

The first sheet metal 120M and the second sheet metal 120M are unwound and conveyed in a side-by-side orientation to provide a total cross machine width of manufactured sheet metal approximately equal to their combined widths, or 144 inches in the present example. The third 105N, fourth 105M, and fifth 105N sheet metals are also unwound and conveyed in a side-by-side orientation, with the fourth sheet metal 105M disposed intermediate the third sheet metal 105N and the fifth sheet metal 105N, such that it is in the center position of the three-sheet-metal group. The total cross machine width of manufactured sheet metal for this three-sheet-metal group is also approximately equal to their combined widths, or 144 inches. After unwinding and prior to being rewound to form a tubular structure 180M, adhesive is applied to one side of the first sheet metal 120M and to one side of the second sheet metal 120M. For example, a permeable roll can be used to apply the adhesive in a desired pattern (defined by the aperture pattern in the surface of the permeable roll) to the top face of the first sheet metal 120M and the top face of the second sheet metal 120M as both the sheet metals travel in a near-horizontal plane. The application pattern may be optimized for the desired tubular structure 180M application. Adhesive can be applied in a continuous line at the transverse leading edge of the first and second sheet metals 120M, in continuous lines along both machine direction edges of the first and second sheet metals 120M, in discrete dots spaced apart in regular intervals in both the machine direction and cross machine directions of the first and second sheet metals 120M, and/or in a continuous line at the transverse trailing edge of the first and second sheet metals 120M.

After the adhesive has been applied to first and second sheet metals 120M, the three-sheet-metal group is brought into face-to-face contact with first and second sheet metals 120M such that the adhesive is disposed intermediate first layer 345 of sheet metals 120M, comprising the first and second sheet metals, and the second layer 350 of sheet metal, comprising the third, fourth, and fifth sheet metals, to create a 2-ply laminate. The 2-ply laminate is then attached to the winding mandrel 160, the winding process 100 is initiated, and the winding process 100 continues until the desired wall thickness and exterior dimensions of the tubular structure 180M are attained, at which point the winding process is terminated and all five sheet metals 120M, 120N are cut off in the cross-machine direction. The winding tension and the force exerted by an adjustable pressure roll 170 can provide sufficient pressure to effectively bond the first 345 and second 350 layers via adhesive bonding. For example, each 2-ply laminate layer can comprise two plies of adhesively bonded sheet metal, and each 2-ply laminate layer within tubular structure 180M can be joined to the underlying 2-ply laminate layer within wound tubular structure 180M by laser welding.

In a preferred embodiment, the widths and relative orientation of the constituent sheet metals for tubular structure 180M are selected to ensure the machine direction sheet metal edges within the first ply of a 2-ply laminate layer do not overlie, nor are the machine direction edges in proximity to, the machine direction sheet metal edges within the second ply of the 2-ply laminate. Such alignment of, or proximity of, machine direction edges in adjacent layers may produce overlying areas of reduced strength, thereby weakening the wound tubular structure 180M or providing a path for leakage from the interior of the tubular structure 180M. In the non-limiting example above, the machine direction edges in first layer 345 of sheet metal in the 2-ply laminate are approximately 72 inches from a first end of tubular structure 180M and the machine direction edges in second layer 350 of the 2-ply laminate are approximately 36 inches and 108 inches from the first end of tubular structure 180M. This significant difference in the cross-machine positions of the machine direction edges of the first 345 and second 350 layers within the 2-ply laminate can provide the desired structural integrity and leak-proof construction targets for tubular structure 180M. This method can provide the capability to produce a wide range of tubular structure 180M lengths, including tubular structure 180M lengths substantially greater than the individual widths of constituent sheet metals 120M, 120N.

Integration of Sensors

Tubular structures 180 can require the integration of sensors 355 to provide operating data useful for controlling a manufacturing process, maintaining safe operating conditions, or planning maintenance activities. Such sensors 355 may include, but are not limited to, flow, pressure, temperature, vibration, leakage, and strain. Prior art manufacturing methods for tubular structures 180 generally require that all sensor 355 integration steps be performed after the production of the tubular structure 180 is complete. This method can require significant effort to integrate sensors 355 and may preclude optimal placement of sensors 355 within the tubular structure 180.

A layered winding method 100 for producing tubular structures 180 can provide the opportunity to integrate sensors 355 into tubular structures 180 more efficiently and in more optimal positions. In one non-limiting example, a first void 230 having a first shape and a first size may be generated in a sheet metal 120 prior to winding the sheet metal 120 as discussed supra to form a tubular structure 180. A second void 230 comprising the first shape and the first size may subsequently be generated in the sheet metal 120 prior to winding into the tubular structure 180. The cross machine position and the machine direction position of the second void 230 may be controlled to align second void 230 to first void 230, both axially and circumferentially, in wound tubular structure 180. Succeeding voids 230 may also be generated within each layer of tubular structure 180 and positioned to align with preceding voids 230 within tubular structure 180, thereby creating a radially oriented hole through the entirety of tubular structure 180. After tubular structure 180 is completely wound, a desired sensor 355 may be inserted into the void volume 285 formed by the overlapping voids 230 and sealed. The sensor 355 may provide useful data from the interior of tubular structure 180 such as flow, pressure, temperature, and the like.

In a second non-limiting example, a plurality of voids 230, each provided in a sheet metal 120 as described supra, can be overlaid during the winding process 100 to form a void volume 285 in tubular structure 180. The winding process may then be paused and a sensor 355 may be installed in the void volume 285. The sensor 355 can be battery operated and/or comprise wireless communication capability. The sensor 355 may provide useful data from the interior of tubular structure 180 such as flow, pressure, temperature, and the like. The data may be wirelessly transmitted through the interior of tubular structure 180 to a receiver positioned at a desired separate position within tubular structure 180 or at a desired separate position in a separate connected tubular structure 180. After sensor 335 is installed, the winding process may be resumed. A desired number of succeeding layers may also comprise aligned void volumes 285 to accommodate portions of the sensor 355 that extend radially. A desired number of layers of sheet metal 120 that do not comprise voids 230 may be subsequently wound onto tubular structure 180 to overlay and enclose the sensor 355 within tubular structure 180. This manufacturing method provides an efficient method of integrating sensors 355 into a tubular structure 180 and can eliminate the need for field wiring sensors 355.

Another non-limiting example provides for a sheet metal 120 to be wound to form first inner region 210 of tubular structure 180. The winding process is then paused. A sensor 355 is then attached to the outer layer of the first inner region 210. The sensor may provide useful data from the second region 215 of the tubular structure 180 such as temperature or strain. The winding process is then resumed. A desired number of succeeding layers of sheet metal 120 may comprise voids 230 that provide clearance for portions of the sensor 355 which protrude radially. A subsequent number of succeeding layers of sheet metal 120 may comprise small circular antenna-size voids 230 that are axially and circumferentially aligned with at least a portion of the sensor 355 as the sheet metal 120 is wound into the tubular structure 180. The voids 230 may create a radially oriented void volume 285 through the wall of the tubular structure 180, from the sensor 355 position to the exterior of the tubular structure 180. After the winding process 100 is complete, an antenna may be inserted through the radially oriented void volume 285, connected to the sensor 355, and the void volume 285 may be sealed around the antenna. In a preferred embodiment, the sensor 355 is battery operated and comprises wireless communication capability. The data may be wirelessly transmitted from the antenna to a remote receiver.

Other components may be integrated into tubular structures 180 during production through appropriate modifications to the manufacturing processes, or by using alternate fabrication techniques known to one of skill in the art.

Tubular Products Comprising Variable Cross Sections

Tubular structures 180 of the present invention can comprise a cross section that is of similar shape and size along the entirety of the longitudinal axis 235 of the tubular structure 180. Alternatively, tubular structures 180 can comprise a cross section that differs substantially in shape, size, or shape and size, along the tubular structure 180 longitudinal axis 235. For example, a tubular structure 180 provided for a circular pipe having a first inside diameter and a first outside diameter at a first end of the pipe and a second inside diameter and a second outside diameter at the opposite second end of the pipe.

A tapered tubular structure 180 may be produced by convolutely winding a relatively narrow strip of sheet metal 120 on a mandrel 160 having the desired pipe internal diameter size and taper. A supply coil 105 supplying sheet metal 120 is mounted on uncoiler apparatus 110 so that the cross-machine position of supply coil 105 may be continuously adjusted. The leading edge 175 of sheet metal 120 is attached to a first end of mandrel 160. The winding process is initiated, and sheet metal 120 is wound around mandrel 160. As mandrel 160 rotates, the cross-machine position of sheet metal supply coil 105 is continuously adjusted so that succeeding bands of sheet metal 120 are disposed in an edge-to-edge configuration on mandrel 160. It may be preferable to provide no overlap between adjacent bands and no significant gaps between adjacent edges of sheet metal 120 bands of each layer of sheet metal 120 wound on mandrel 160.

The angle of sheet metal 120 relative to the longitudinal axis of mandrel 160 can be controlled to be less than 90 degrees or greater than 90 degrees as sheet metal 120 is wound on mandrel 160. For example, the winding angle of sheet metal 120 in a first inner region 210 can be 80 degrees and the winding angle of the sheet metal 120 in an overlying second region 215 can be 100 degrees. The winding angle can alternate in successive regions and be maintained within the tapered tubular structure 180. The winding angle alternation can ensure the edges between sheet metal 120 bands in a layer do not align with edges between sheet metal 120 bands in adjacent layers. Adjacent layers of sheet metal 120 can be welded during the winding operation. The winding process continues until the desired wall thickness and desired outer dimensions of the tubular structure are attained. This fabrication method can provide a tapered tubular structure 180 with desired structural integrity and resistance to leakage between the tubular structure 180 interior and the tubular structure 180 exterior.

Alternatively, mandrel 160 can be fabricated to provide a first shape and a first size at a first end of mandrel 160 and a second shape and a second size at the opposed end of mandrel 160. Narrow strips of sheet metal 120 may be wound on mandrel 160 to form tubular structure 180. Overall, tubular structure 180 would have an interior cross sectional shape and size that is similar to mandrel 160. Mandrel 160 embodiments may comprise multiple cross-sectional shapes and sizes along the longitudinal axis. For example, mandrel 160 may have at least two cross-sectional shapes and sizes.

EXAMPLES

Example 1

A sheet metal is convolutely wound on a mandrel to form a tubular structure. A 72 inch wide supply coil of 304 grade stainless steel sheet metal comprising a uniform thickness of 0.020 inches is unwound, the leading edge of the sheet metal is conveyed to a round, 48 inch diameter mandrel, attached to the mandrel, and rewound until a wall thickness of 3 inches is attained, at which point the sheet metal is cut off in the cross machine direction and the winding operation is terminated. At least a portion of adjacent layers of sheet metal are welded together as they are wound into the tubular structure. The wound tubular structure comprises a length of 72 inches, an internal diameter of 48 inches, a uniform wall thickness of 3 inches, and an outside diameter of 54 inches. The tube may be used to convey liquids or gases within the interior diameter or used as a structural member.

Example 2

A first sheet metal and a second sheet metal are sequentially convolutely wound on a mandrel to form a tubular structure. A 72 inch wide supply coil of 316 grade stainless steel sheet metal comprising a uniform thickness of 0.010 inches is unwound, the leading edge of the sheet metal is conveyed to a round, 18 inch diameter mandrel, attached to the mandrel, and rewound to form a first inner region of a tubular structure until a wall thickness of 0.25 inches is attained, at which point the sheet metal is cut off in the cross machine direction and the winding operation is paused. A 72 inch wide supply coil of 1008 grade carbon steel comprising a uniform thickness of 0.015 inches is then unwound, attached to the outer layer of the first inner region comprising 316 grade stainless steel, and rewound to form the second region until an incremental wall thickness of 1.5 inches is attained, at which point the sheet metal is cut off in the cross machine direction, and the winding operation is paused. The 72 inch wide supply coil of 316 grade stainless steel comprising a uniform thickness of 0.010 inches is then unwound again, attached to the outer layer of the second region comprising 1008 grade carbon steel, and rewound to form a third region until an incremental wall thickness of 0.25 inches is attained, at which point the sheet metal is cut off in the cross machine direction, and the winding operation is terminated. All adjacent layers of sheet metal are welded together as they are wound into the tubular structure. The wound tubular structure comprises a length of 72 inches, an internal diameter of 18 inches, a uniform wall thickness of 2 inches, and an outside diameter of 22 inches. The inner and outer regions of the tubular structure comprise 316 grade stainless steel and the second region comprises 1008 grade carbon steel. In a second non-limiting example of the second embodiment, the inner and outer regions of the tubular structure comprise 316 grade stainless steel and the second region comprises paperboard. The tubular structure may be used to convey liquids or gases within the interior diameter or used as a structural member.

Example 3

A sheet metal is convolutely wound on a mandrel to form a tubular structure and end couplings are integrated into the tubular structure during the winding process. A 60 inch wide supply coil of 304 grade stainless steel sheet metal comprising a uniform thickness of 0.020 inches is unwound, the leading edge of the sheet metal is conveyed to a round, 30 inch diameter mandrel, attached to the mandrel, and the winding process is initiated. After an inner region of the tubular structure is formed, a first flange coupling, and a second flange coupling are placed over the two ends of the first inner region and integrated into the wound tubular structure as the second and third regions of the tubular structure are formed. The winding process continues until a total wall thickness of 3 inches is attained, at which point the sheet metal is cut off in the cross machine direction and the winding operation is terminated. At least a portion of adjacent layers of sheet metal are welded together as they are wound into the tubular structure. The wound tubular structure comprises a length of 62 inches (including a 1 inch flange thickness that is integral with each end coupling), an internal diameter of 30 inches, a uniform wall thickness of 3 inches, and an outside diameter of 36 inches. The couplings integrated into each end of the wound tubular structure are used to connect the tubular structure to other tubular structures, thereby creating an extended length of two or more tubular structures. The extended length tubular structure may be used to convey liquids or gases within the interior diameter or used as a structural member.

What is claimed is:

1. A process for winding a convolutely wound tubular structure having a machine direction, a cross-machine direction coplanar thereto, and a Z-direction orthogonal to both said machine- and cross-machine directions, said process comprising the steps of:
    a) providing a first sheet metal supply coil comprising a first sheet metal;
    b) disposing said first sheet metal supply coil on an uncoiler;
    c) unwinding said first sheet metal from said first sheet metal supply coil with said uncoiler;
    d) directing said first sheet metal to a recoiler;
    e) providing said recoiler with a mandrel, said mandrel having a defined geometry, said geometry providing said convolutely wound tubular structure with a desired internal cross-sectional shape and size;
f) disposing a leading edge of said first sheet metal on said mandrel,
g) rotating said mandrel to coaxially dispose said first sheet metal about said mandrel to form a first inner region of said convolutely wound tubular structure and provide said first inner region of said convolutely wound tubular structure with a first desired thickness;
h) when said first inner region of said convolutely wound tubular structure attains said first desired thickness, severing said first sheet metal in said cross-machine direction, forming a first tail portion of said first inner region;
i) attaching said first tail portion of said first inner region to a previous convolution of said first inner region of said convolutely wound tubular structure;
j) removing said convolutely wound tubular structure from said mandrel;
k) prior to said step j), attaching a second sheet metal to said first tail portion of said first inner region;
l) Rotating said mandrel to coaxially dispose said second sheet metal about said tubular structure to form a second region of said convolutely wound tubular structure comprising the second sheet metal and provide said second region of said convolutely wound tubular structure comprising the second sheet metal with a desired thickness;
m) when said second region of said convolutely wound tubular structure comprising the second sheet metal attains said desired thickness, severing said second sheet metal in said cross-machine direction forming a second tail portion; and,
n) attaching said second tail portion to said second region of said convolutely wound tubular structure.

2. The process of claim 1 further comprising the step of:
o) prior to said step k), overlaying only a portion of said first sheet metal with said second sheet metal.

3. The process of claim 1 further comprising the steps of:
o) prior to said step j) and after said step n), attaching a third sheet metal to said second tail portion of said second region;
p) rotating said mandrel to coaxially dispose said third sheet metal about said tubular structure to form a third region of said convolutely wound tubular structure and provide said third region of said convolutely wound tubular structure with a third desired thickness;
q) when said third region of said convolutely wound tubular structure attains said third desired thickness, severing said third sheet metal in said cross-machine direction forming a third tail portion; and,
r) attaching said third tail portion to said third region of said convolutely wound tubular structure.

4. The process of claim 1 further comprising the step of:
o) prior to said step l), removing at least a portion of said second sheet metal forming voids therein.

5. The process of claim 4 further comprising the steps of:
p) overlaying successive voids disposed within said second sheet metal during said step l) thereby forming enclosed internal pockets within said second region of said convolutely wound tubular structure; and,
q) disposing insulation within said enclosed internal pockets.

6. The process of claim 1 further comprising the step of:
o) prior to said step l), deforming at least a portion of said second sheet metal in said Z-direction forming protrusions and recessions therein.

7. The process of claim 1 further comprising the step of:
o) bonding a first convolution of said second sheet metal to a final convolution of said first sheet metal as said first convolution of said second sheet metal is coaxially disposed about said last convolution of said first sheet metal in said step l).

8. The process of claim 7 further comprising the step of:
p) adhesively bonding said first convolution of said second sheet metal to said final convolution of said first sheet metal as said first convolution of said second sheet metal is coaxially disposed about said last convolution of said first sheet metal in said step l).

9. The process of claim 7 further comprising the step of:
p) welding said first convolution of said second sheet metal to said final convolution of said first sheet metal as said first convolution of said second sheet metal is coaxially disposed about said last convolution of said first sheet metal in said step l).

10. The process of claim 1 further comprising the steps of:
o) applying a material to a first side of said first sheet metal; and,
p) attaching said first side to said mandrel in said step f).

11. The process of claim 1 further comprising the step of:
o) during said step g), bonding at least a portion of one successive convolution of said first sheet metal to a prior convolution of said first sheet metal as said first sheet metal is being coaxially disposed about said mandrel to form said first region of said convolutely wound tubular structure.

12. The process of claim 11 further comprising the step of:
p) adhesively bonding said at least a portion of one successive convolution of said first sheet metal to said prior convolution of said first sheet metal.

13. The process of claim 11 further comprising the step of:
p) welding said at least a portion of one successive convolution of said first sheet metal to said prior convolution of said first sheet metal.

14. The process of claim 1 further comprising the step of:
o) providing said recoiler with an adjustable pressure roll, said adjustable pressure roll providing a pressure to said mandrel and said first sheet metal disposed coaxially disposed thereon.

15. The process of claim 14 further comprising the step of:
p) applying a differential pressure in said cross-machine direction with said adjustable pressure roll to said mandrel and said first sheet metal disposed coaxially disposed thereon.

16. The process of claim 1 further comprising the steps of:
o) providing said process with an edge slitting process; and,
p) prior to said step f), slitting at least one machine direction edge of said first sheet metal with said edge slitting process, said edge slitting process reducing a cross-machine direction width of said first sheet metal.

17. The process of claim 16 further comprising the step of:
q) prior to said step f), slitting opposed machine direction edges of said first sheet metal with said edge slitting process, said edge slitting process reducing a cross-machine direction width of said first sheet metal.

18. The process of claim 1 further comprising the steps of:
o) prior to said step j), attaching a material other than metal to said first tail portion of said first inner region;
p) rotating said mandrel to coaxially dispose said other than metal material about said tubular structure to form a region of said convolutely wound tubular structure comprising the other than metal material and provide said region of said convolutely wound tubular structure comprising the other than metal material with a desired thickness;
q) when said region of said convolutely wound tubular structure comprising the other than metal material attains said desired thickness, severing said other than metal material in said cross-machine direction, forming said second tail portion; and,
r) attaching said second tail portion to a previous convolution of said region of said convolutely wound tubular structure comprising the other than metal material.

19. The process of claim 18 further comprising the steps of:
s) prior to said step j) and after said step n), attaching a third sheet metal to said second tail portion of said region comprising the other than metal material;
t) rotating said mandrel to coaxially dispose said third sheet metal about said tubular structure to form a third region of said convolutely wound tubular structure and provide said third region of said convolutely wound tubular structure with a third desired thickness;
u) when said third region of said convolutely wound tubular structure attains said third desired thickness, severing said third sheet metal in said cross-machine direction forming a third tail portion; and,
v) attaching said third tail portion to a previous convolution of said third region of said convolutely wound tubular structure.

20. The process of claim 1 further comprising the steps of:
o) providing said recoiler with a measurement system;
p) measuring a diameter of said mandrel with said measurement system,
q) during said step g), measuring an outer diameter of said convolutely wound tubular structure with said measurement system;
r) determining the thickness of said first inner region of said convolutely wound tubular structure by comparing said outer diameter to said diameter of said mandrel with a controller to determine a measured thickness; and,
s) when said measured thickness equals said first desired thickness for the first inner region, said controller proceeds to said step h).

* * * * *